US010850772B2

(12) United States Patent
Kurokawa

(10) Patent No.: US 10,850,772 B2
(45) Date of Patent: Dec. 1, 2020

(54) VEHICLE FRAME STRUCTURE

(71) Applicant: TOYOTA JIDOSHA KABUSHIKI KAISHA, Toyota (JP)

(72) Inventor: Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/292,689

(22) Filed: Mar. 5, 2019

(65) Prior Publication Data

US 2019/0283805 A1    Sep. 19, 2019

(30) Foreign Application Priority Data

Mar. 19, 2018   (JP) .................. 2018-051166

(51) Int. Cl.
*B62D 21/02* (2006.01)
*B62D 29/00* (2006.01)
*B62D 27/02* (2006.01)
*B62D 29/04* (2006.01)

(52) U.S. Cl.
CPC ............. *B62D 21/02* (2013.01); *B62D 27/02* (2013.01); *B62D 29/005* (2013.01); *B62D 29/043* (2013.01); *B62D 29/048* (2013.01); *B60G 2206/7101* (2013.01)

(58) Field of Classification Search
CPC ...... B62D 25/20; B62D 25/025; B62D 25/06; B62D 25/02; B62D 25/04; B62D 27/026; B62D 29/00

USPC .................................................... 296/203.01
See application file for complete search history.

(56) References Cited

U.S. PATENT DOCUMENTS

2004/0119276 A1* 6/2004 Fior ................. B62D 21/12
280/781
2017/0240211 A1* 8/2017 Terada ................ B60J 1/006

FOREIGN PATENT DOCUMENTS

JP    2007-253573 A    10/2007
JP    2015-160524 A    9/2015
JP    2016-107485 A    6/2016

* cited by examiner

*Primary Examiner* — Pinel E Romain
(74) *Attorney, Agent, or Firm* — Oliff PLC

(57) ABSTRACT

A vehicle frame structure includes: an adhesive member that is superimposed on and adhered to a plate shaped vehicle frame member extending in one direction such that the adhesive member is superimposed in a thickness direction of the vehicle frame member; a first fiber reinforced plastic member that includes plural first fibers oriented in different directions to each other, and that is disposed spaced apart from the vehicle frame member in the thickness direction; and a second fiber reinforced plastic member that includes plural second fibers oriented in an orientation direction of an intersecting direction intersecting the thickness direction, that has a thinner thickness in the thickness direction than a thickness of the first fiber reinforced plastic member, and that is sandwiched between the adhesive member and the first fiber reinforced plastic member in the thickness direction.

6 Claims, 17 Drawing Sheets

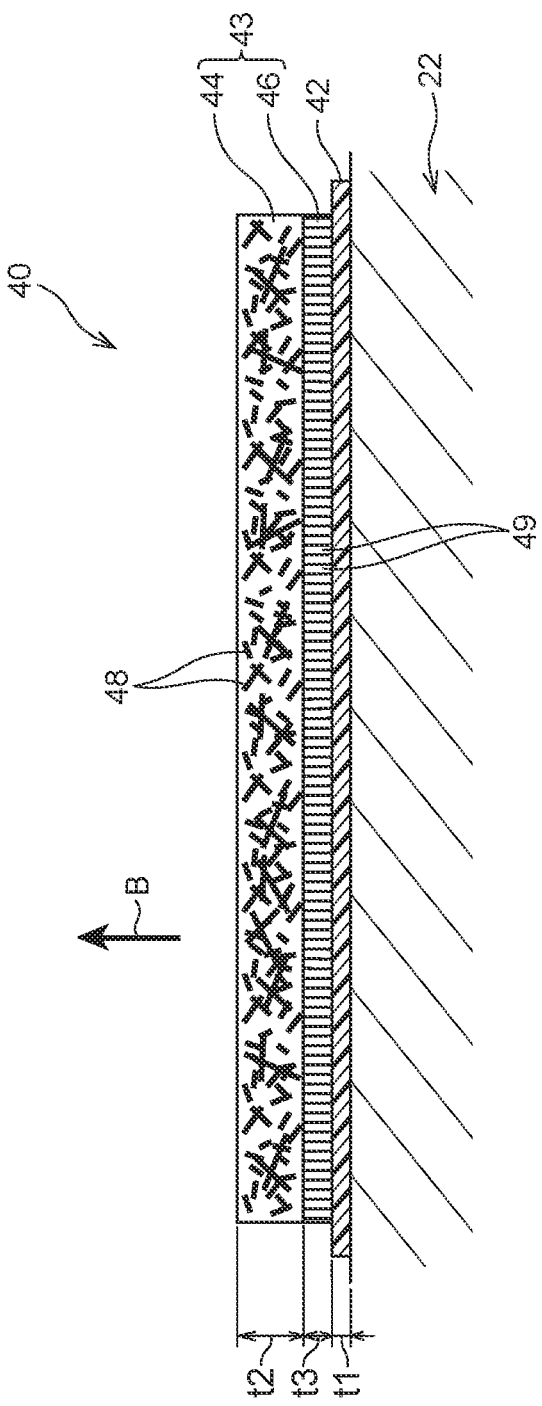

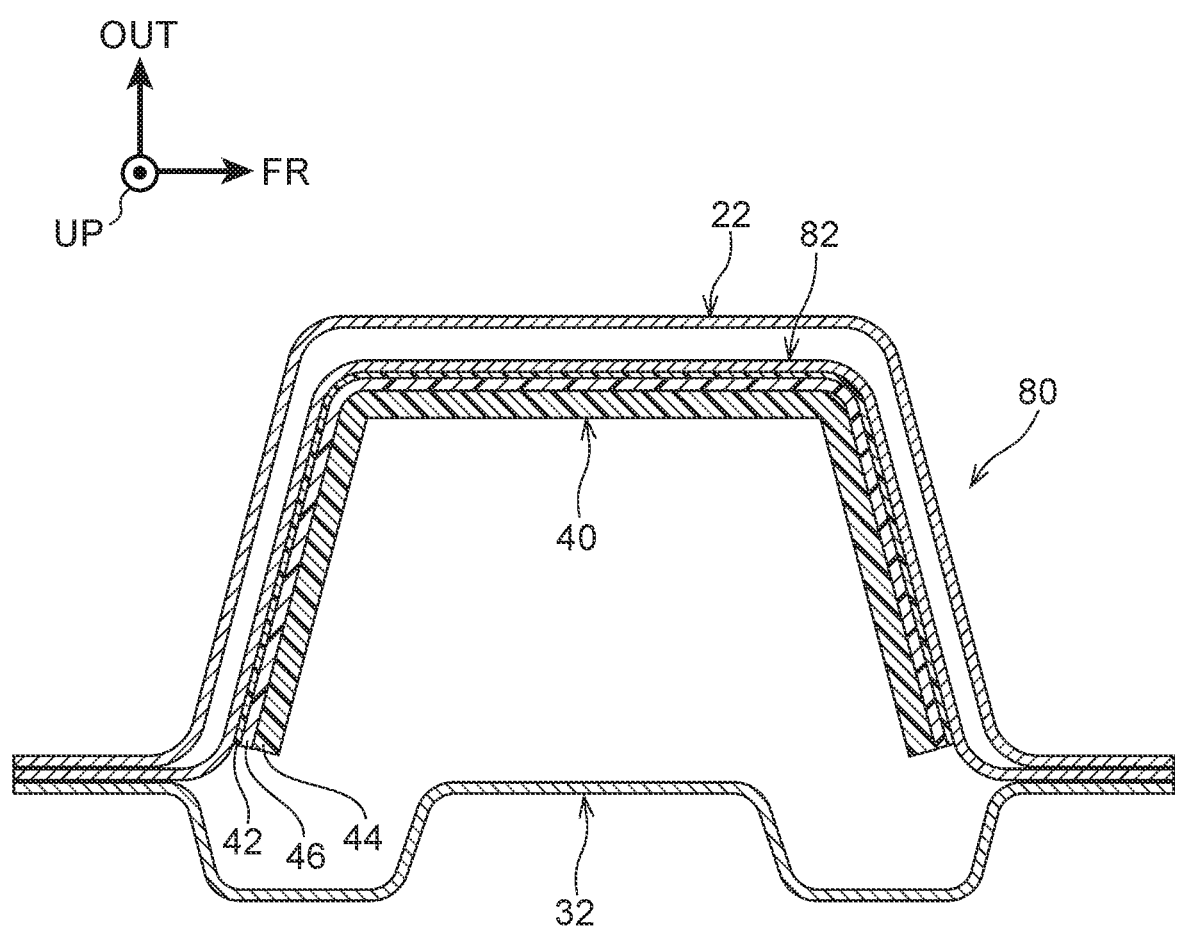

VEHICLE FRAME STRUCTURE

CROSS-REFERENCE TO RELATED APPLICATION

This application is based on and claims priority under 35 USC 119 from Japanese Patent Application No. 2018-051166 filed on Mar. 19, 2018, the disclosure of which is incorporated by reference herein.

BACKGROUND

Technical Field

The present disclosure relates to a vehicle frame structure.

Related Art

Japanese Patent Application Laid-Open (JP-A) No. 2015-160524 discloses a vehicle body structure in which a carbon fiber reinforced plastic (CFRP) reinforcement member is adhered to a vehicle width direction inner wall of a metal B-pillar (center pillar). The reinforcement member includes a layer of continuous carbon fibers that are oriented along the length direction of the B-pillar, the layer having a thickness of at least 0.8 mm.

Fiber reinforced plastic (FRP) including continuous fibers aligned along an orientation direction is more expensive than FRP including fibers oriented along different directions. Accordingly, vehicle frame structures in which vehicle frame members are reinforced by a fiber reinforced plastic member including continuous fibers are higher in cost than configurations including fibers oriented along different directions.

Vehicle frame structures in which a vehicle frame member is reinforced by a fiber reinforced plastic member including randomly oriented fibers are lower in cost than configurations including continuous fibers. However, in configurations employing a fiber reinforced plastic member including randomly oriented fibers, when heating to soften the resin to configure a base member, a greater tendency is seen in an adhesive used to adhere the vehicle frame member and the fiber reinforced plastic member together to be liable to flow than in cases in which a fiber reinforced plastic member including aligned fibers is employed. The adhesive being liable to flow means that there is a reduction in the adhesiveness between the vehicle frame member and the fiber reinforced plastic member.

Namely, in configurations in which a vehicle frame member is reinforced by a fiber reinforced plastic member, there is room for improvement with regard to suppressing an increase in cost and also preventing a reduction in the adhesiveness between the vehicle frame member and the fiber reinforced plastic member.

SUMMARY

In consideration of the above circumstances, the present disclosure provides a vehicle frame structure configured such that a vehicle frame member is reinforced by fiber reinforced plastic that is capable of suppressing an increase in cost and also preventing a reduction in the adhesiveness between the vehicle frame member and the fiber reinforced plastic.

A first aspect of the present disclosure is a vehicle frame structure including an adhesive member, a first fiber reinforced plastic member, and a second fiber reinforced plastic member. The adhesive member is superimposed on and adhered to a plate shaped vehicle frame member extending in one direction such that the adhesive member is superimposed in a thickness direction of the vehicle frame member. The first fiber reinforced plastic member includes plural first fibers oriented in different directions to each other, and is disposed spaced apart from the vehicle frame member in the thickness direction. The second fiber reinforced plastic member includes plural second fibers oriented in an orientation direction of an intersecting direction intersecting the thickness direction, has a thinner thickness in the thickness direction than a thickness of the first fiber reinforced plastic member, and is sandwiched between the adhesive member and the first fiber reinforced plastic member in the thickness direction.

In the vehicle frame structure according to the aspect, the adhesive member is superimposed on and adhered to the vehicle frame member in the thickness direction. The second fiber reinforced plastic member is adhered to the adhesive member. The first fiber reinforced plastic member is superimposed on the second fiber reinforced plastic member in the thickness direction. The vehicle frame structure is formed by applying heat and pressure in a state in which in which the vehicle frame member, the adhesive member, the second fiber reinforced plastic member, and the first fiber reinforced plastic member are superimposed on each other in the thickness direction.

The second fiber reinforced plastic member is more expensive than the first fiber reinforced plastic member. However, the thickness of the second fiber reinforced plastic member is thinner than the thickness of the first fiber reinforced plastic member, and the second fiber reinforced plastic member is used in a smaller amount in the vehicle frame structure. Namely, an increase in cost may be better suppressed in the vehicle frame structure than in a vehicle frame structure employing only the second fiber reinforced plastic member.

The second fiber reinforced plastic member that includes the plural oriented second fibers has a greater contact surface area between fibers than the first fiber reinforced plastic member that includes the plural first fibers oriented in different directions. In other words, when the second fiber reinforced plastic member is heated, the resin base material does not readily flow in directions intersecting the orientation direction of the fibers. Accordingly, the adhesive member that is in contact with the second fiber reinforced plastic member is better suppressed from flowing with the resin base material than in cases in which the adhesive member is in contact with the first fiber reinforced plastic member. A reduction in the adhesiveness between the vehicle frame member and the fiber reinforced plastic members is thus prevented. Namely, the vehicle frame structure of the aspect is capable of suppressing an increase in cost and is also capable of preventing a reduction in the adhesiveness between the vehicle frame member and the fiber reinforced plastic members.

In the aspect, the second fibers may be oriented such that the intersecting direction is aligned with the one direction of the vehicle frame member.

In the above configuration, the second fibers are oriented so as to be aligned with the one direction of the vehicle frame member. This thereby enables a reduction in the bending rigidity against collision load acting in the one direction to be suppressed, thereby enabling deformation of the vehicle frame member to be suppressed.

In the aspect, the first fiber reinforced plastic member may be formed with a thickened portion having a thicker thickness in the thickness direction than the thickness of a peripheral portion.

In the above configuration, the first fiber reinforced plastic member is formed with the thickened portion. Namely, the locally reinforced thickened portion increases the bending rigidity with respect to collision load acting in a collision direction. In a collision, the thickened portion resists collision load acting on the vehicle frame member, enabling buckling deformation of the vehicle frame member to be better suppressed than in configurations not including the thickened portion.

In the aspect, the thickened portion may be configured by plural ribs projecting in the thickness direction from a base portion in close contact with the second fiber reinforced plastic member.

In the above configuration, the thickened portion is configured by the plural ribs projecting in the thickness direction from the base portion. In a collision, the plural ribs resist collision load acting on the vehicle frame member, enabling buckling deformation of the vehicle frame member to be better suppressed than in configurations not including the plural ribs. Moreover, spaces between the plural ribs configure recesses where the first fiber reinforced plastic member is not present, enabling the weight of the vehicle frame structure to be reduced compared to configurations not including the ribs. Namely, the above configuration is capable of suppressing buckling deformation of the vehicle frame member and also capable of reducing the weight of the vehicle frame structure.

In the aspect, the first fiber reinforced plastic member may be formed with a thinned portion having a thinner thickness in the thickness direction than at least the thickness of the peripheral portion.

In the above configuration, the locally reinforced thickened portion increases the bending rigidity with respect to collision load acting in a collision direction. This allows a reduction in the bending rigidity at a location at the outer side of the peripheral portion. Forming the thinned portion at the outer side of the peripheral portion enables a reduction in weight of the vehicle frame structure, while still suppressing a reduction in bending rigidity with respect to collision load acting in a collision direction.

In the aspect, the vehicle frame member may be a pillar that connects a rocker provided at a vehicle lower section to a roof side rail provided at a vehicle upper section and that extends in the intersecting direction.

In the above configuration, the first fiber reinforced plastic member and the second fiber reinforced plastic member are provided to the pillar on which a large bending load acts readily in a side collision. This thereby enables an increase in cost and a reduction in the adhesiveness to be suppressed, while preventing a reduction in the bending rigidity of the pillar with respect to collision acting in a collision direction.

In this manner, the aspect of the present disclosure enables an increase in cost to be suppressed and also enable a reduction in the adhesiveness between the vehicle frame member and the fiber reinforced plastic to be suppressed in a configuration in which the vehicle frame member is reinforced by a fiber reinforced plastic member.

BRIEF DESCRIPTION OF THE DRAWINGS

Exemplary embodiments will be described in detail based on the following figures, wherein:

FIG. 4 is a schematic explanatory diagram illustrating a configuration of layers in the vehicle frame structure according to the first exemplary embodiment;

FIG. 14 is a lateral cross-section illustrating a center pillar according to a first modified example;

DETAILED DESCRIPTION

First Exemplary Embodiment

Figure 1:
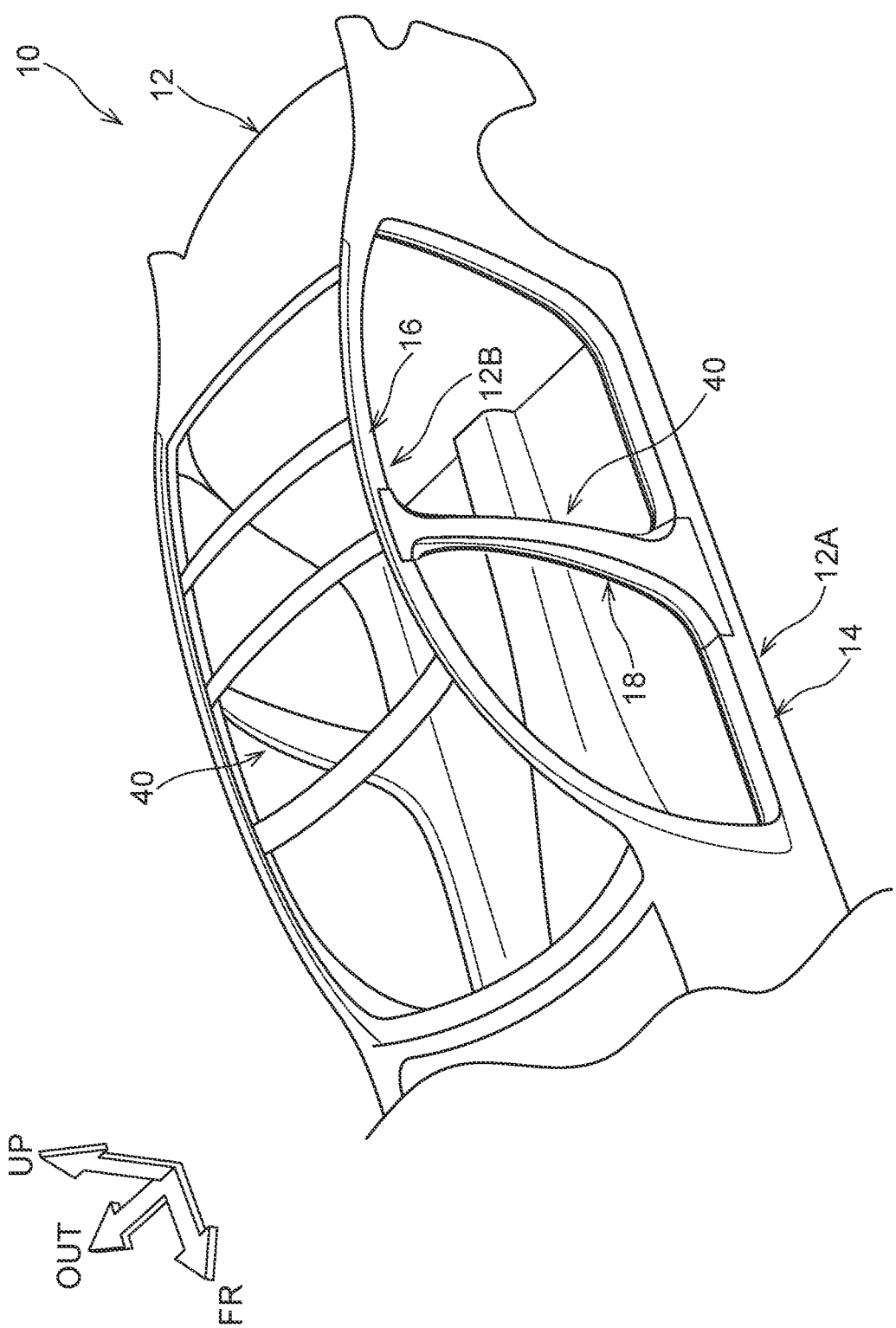
FIG. 1 is a perspective view illustrating a vehicle body applied with a vehicle frame structure according to a first exemplary embodiment.

Explanation follows regarding a vehicle frame structure 40 of a first exemplary embodiment as an example of a vehicle frame structure. Note that in the drawings, the arrow FR points toward the vehicle front (direction of travel), the arrow UP points toward the vehicle upper side, and the arrow OUT points toward a vehicle width direction outer side. In the following explanation, unless specifically stated otherwise, reference to front and rear, upward and downward, and left and right respectively refer to front and rear in a vehicle front-rear direction, upward and downward in a vehicle vertical direction, and left and right in a vehicle width direction when facing the direction of travel.

FIG. 1 illustrates a vehicle body 12 configuring part of a vehicle 10. The vehicle body 12 includes rockers 14, roof side rails 16, and center pillars 18. The vehicle frame structure 40, described later, is applied to the respective center pillars 18.

Each rocker 14 is provided to a vehicle lower section 12A of the vehicle body 12, and extends along the vehicle front-rear direction. Each roof side rail 16 is provided to a vehicle upper section 12B of the vehicle body 12, and extends along the vehicle front-rear direction. The vehicle 10 is basically configured with left-right symmetry about the vehicle width direction center of the vehicle body 12. Accordingly, the following explanation describes the vehicle frame structure 40 on the right side of the vehicle 10, and explanation regarding the vehicle frame structure 40 on the left side is omitted.

Each center pillar 18 is an example of a pillar, and extends along an A direction (see FIG. 2) so as to connect the rocker 14 to the corresponding roof side rail 16. The A direction is set as an inclined direction that intersects the vehicle vertical direction such that an upper end of the center pillar 18 with respect to the center thereof is positioned further toward the vehicle rear than a lower end of the center pillar 18, when the center pillar 18 is viewed along the vehicle width direction. The A direction is also an example of "one direction" and an "intersecting direction". A lower end portion of the center pillar 18 is joined to a vehicle front-rear direction central portion of the rocker 14, and an upper end portion of the center pillar 18 is joined to a vehicle front-rear direction central portion of the roof side rail 16.

Figure 2:
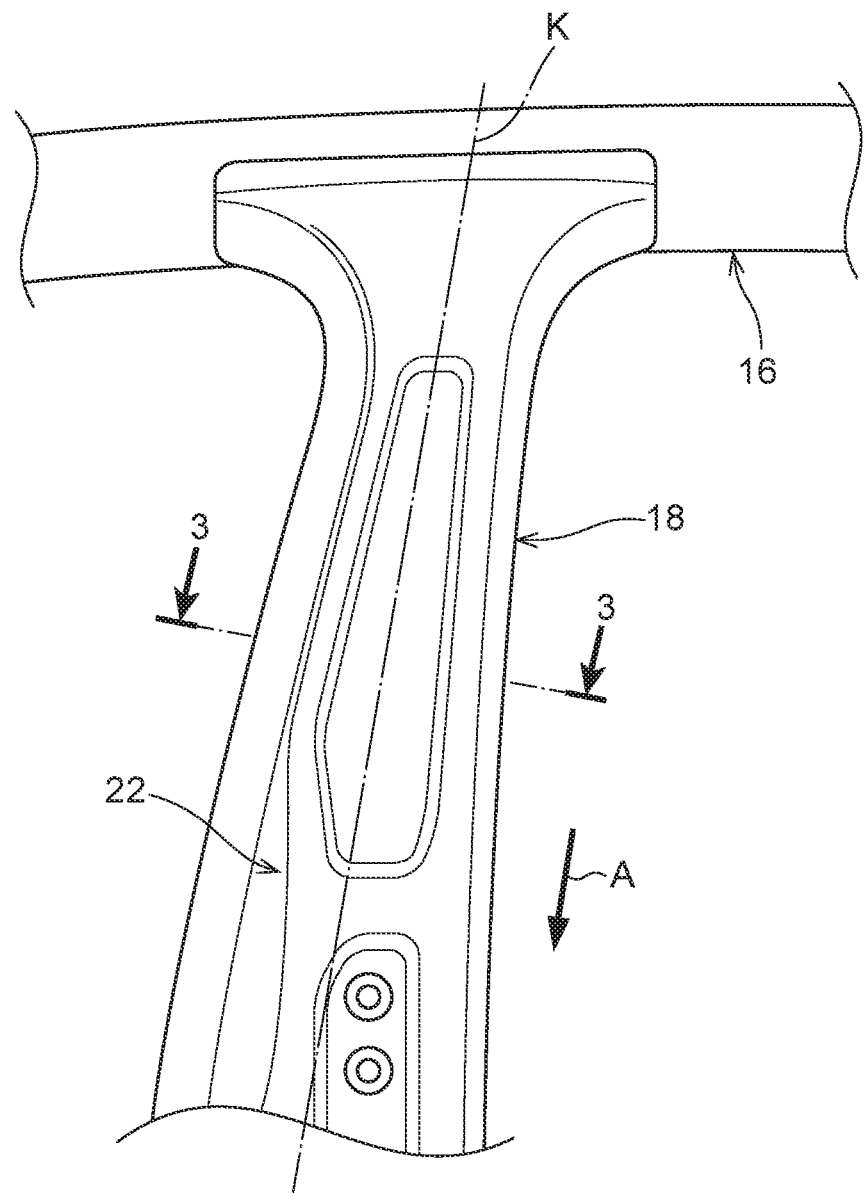
FIG. 2 is an explanatory diagram illustrating part of a center pillar according to the first exemplary embodiment as viewed from a vehicle width direction outer side.

As illustrated in FIG. 2, an imaginary line K indicates the axial center of the center pillar 18. The imaginary line K is formed by connecting vehicle front-rear direction center positions of the center pillar 18 along the extension direction of the center pillar 18 when the center pillar 18 is viewed along the vehicle width direction. In the following explanation, the imaginary line K is referred to as the axial center K. Namely, the direction in which the imaginary line K extends corresponds to the axial direction of the center pillar 18.

Figure 3:
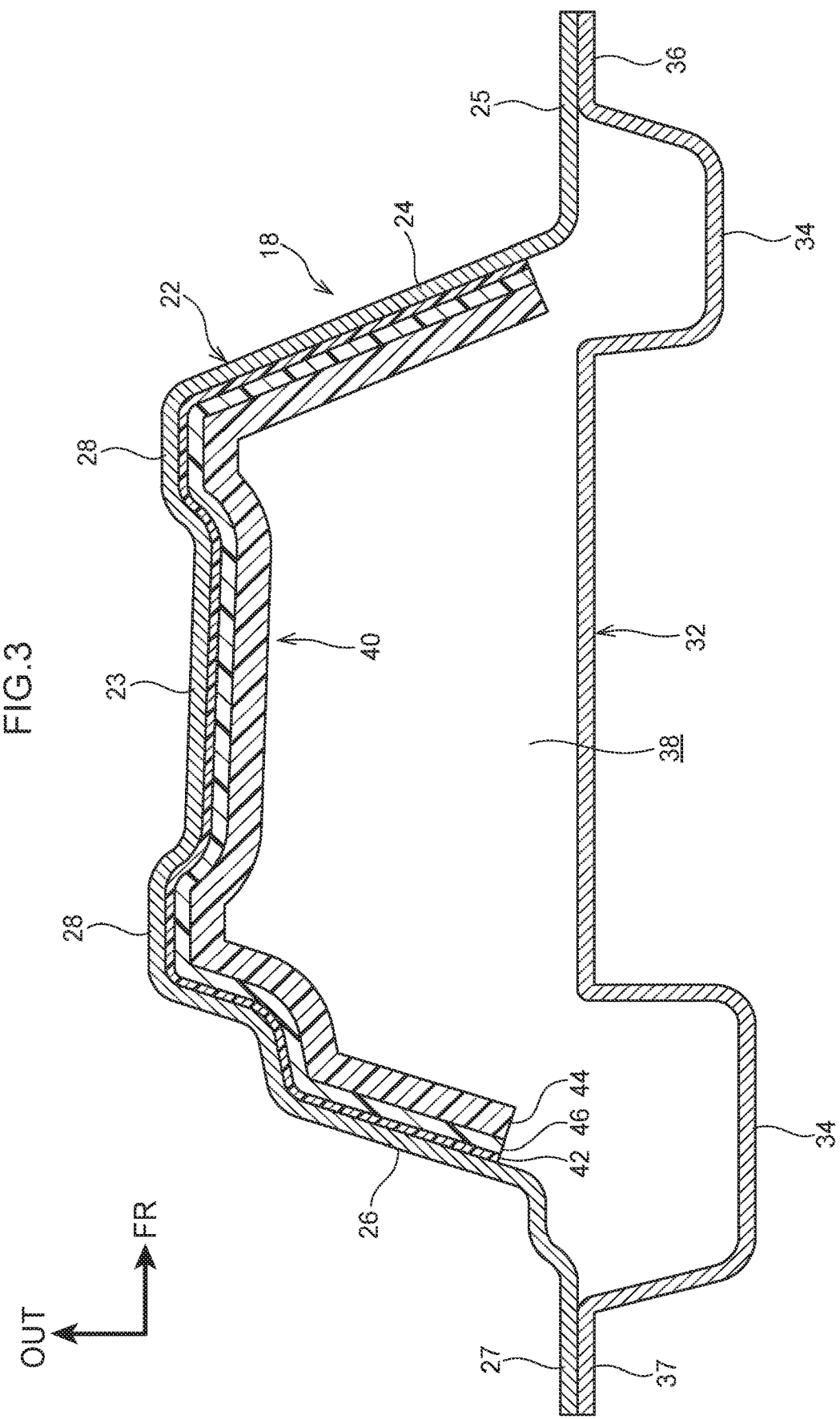
FIG. 3 is a lateral cross-section (a cross-section taken along line 3-3 in FIG. 2) illustrating the center pillar according to the first exemplary embodiment.

As illustrated in FIG. 3, the center pillar 18 includes an outer panel 22 disposed at the vehicle width direction outer side, an inner panel 32 disposed at the vehicle width direction inner side of the outer panel 22, and the vehicle frame structure 40, described later.

Outer Panel

The outer panel 22 is an example of a vehicle frame member. The outer panel 22 extends along the A direction (see FIG. 2) and has a plate shape with its thickness direction in the vehicle width direction. The outer panel 22 has a hat-shaped cross-section profile opening toward the vehicle width direction inner side as viewed along the A direction. Specifically, the outer panel 22 is configured by a standard steel sheet. The outer panel 22 includes a side wall 23, a front wall 24, a front flange 25, a rear wall 26, and a rear flange 27.

The side wall 23 is disposed with its thickness direction along the vehicle width direction, and extends along the vehicle front-rear direction. The side wall 23 is formed with two protrusions 28 that project toward the vehicle width direction outer side at a front portion and a rear portion of the side wall 23 in the vehicle front-rear direction. The front wall 24 extends from a vehicle front-rear direction front end of the side wall 23 toward the vehicle width direction inner side. The front flange 25 extends from a vehicle width direction inner end of the front wall 24 toward the vehicle front. The rear wall 26 extends from a vehicle front-rear direction rear end of the side wall 23 toward the vehicle width direction inner side. Part of the rear wall 26 is formed with a crank profile as viewed along the A direction as an example. The rear flange 27 extends from a vehicle width direction inner end of the rear wall 26 toward the vehicle rear. The vehicle frame structure 40, described later, is provided to vehicle width direction inner faces of the side wall 23, the front wall 24, and the rear wall 26.

Inner Panel

The inner panel 32 is formed in a plate shape with its thickness direction in the vehicle width direction, and extends along the vehicle front-rear direction. The inner panel 32 is formed with two protrusions 34 that project toward the vehicle width direction inner side at a front portion and a rear portion of the inner panel 32 in the vehicle front-rear direction. A front flange 36 is formed running along the vehicle front-rear direction at a front end portion of the inner panel 32. A rear flange 37 is formed running along the vehicle front-rear direction at a rear end portion of the inner panel 32. The front flange 36 and the front flange 25 are spot welded together in the vehicle width direction, and the rear flange 37 and the rear flange 27 are also spot welded together in the vehicle width direction, to form a closed cross-section space 38 in the center pillar 18.

Vehicle Frame Structure

Next, explanation follows regarding the vehicle frame structure 40.

The vehicle frame structure 40 illustrated in FIG. 4 includes an adhesive sheet 42, serving as an example of an adhesive member, a first fiber reinforced plastic member 44, and a second fiber reinforced plastic member 46. As an example, the vehicle frame structure 40 is provided to the outer panel 22. Specifically, the adhesive sheet 42, the second fiber reinforced plastic member 46, and the first fiber reinforced plastic member 44 are provided to the outer panel 22 by being superimposed in this sequence on the side wall 23, the front wall 24, and the rear wall 26 (see FIG. 3) from the vehicle cabin inside. The first fiber reinforced plastic member 44 and the second fiber reinforced plastic member 46 are referred to collectively as a reinforcement member 43.

Adhesive Sheet

The adhesive sheet 42 is, as an example, configured by a thermosetting resin formed in a sheet shape. The adhesive sheet 42 is formed corresponding to the profile and size of the side wall 23, the front wall 24, and the rear wall 26 (see FIG. 3). Moreover, the adhesive sheet 42 melts at the heating temperature at which the first fiber reinforced plastic member 44 is softened.

The adhesive sheet 42 is superimposed on the outer panel 22 in the thickness direction of the outer panel 22, and adhered thereto. In the following explanation, the thickness direction of the outer panel 22 is referred to as the B direction (indicated by the arrow B). Specifically, the adhesive sheet 42 is softened by heat and pressure and then hardened by cooling, so as to adhere the second fiber reinforced plastic member 46 to the side wall 23, the front wall 24, and the rear wall 26 (see FIG. 3). The thickness of the adhesive sheet 42 in the B direction is t1 (mm).

First Fiber Reinforced Plastic Member

The first fiber reinforced plastic member 44 is, as an example, configured by a CFRP in which plural, non-continuous carbon fibers 48 are embedded with random orientation in a base material configured by an unsaturated polyester resin. In other words, the first fiber reinforced plastic member 44 includes plural of the carbon fibers 48. The carbon fibers 48 are an example of a first fiber. In the present specification, "non-continuous fibers" refers to fibers having an orientation direction length shorter than 100 mm. "Random orientation" refers to a state in which the plural non-continuous fibers are orientated in different orientation directions to each other (i.e., are not aligned in one direction).

The base material of the first fiber reinforced plastic member 44 is characterized in that it melts (runs) when applied with heat and pressure during molding. The first fiber reinforced plastic member 44 is formed in a sheet shape after being applied with heat and pressure and hardened. The first fiber reinforced plastic member 44 has a thickness of t2 (mm) in the B direction. The first fiber reinforced plastic member 44 is disposed spaced apart from the outer panel 22 in the B direction.

Second Fiber Reinforced Plastic Member

The second fiber reinforced plastic member 46 is, as an example, configured by a CFRP in which plural, continuous carbon fibers 49 are embedded oriented in one direction in a base material configured by an unsaturated polyester resin. In other words, the second fiber reinforced plastic member 46 includes plural of the carbon fibers 49. The carbon fibers 49 are an example of a second fiber. In the present specification, "continuous fibers" refers to fibers having an orientation direction length of no less than 100 mm.

The plural carbon fibers 49 are oriented in the A direction (see FIG. 2) as an example of the one direction. The A direction is also an example of an intersecting direction that intersects the B direction. In other words, the plural carbon fibers 49 are oriented such that the intersecting direction is aligned with the one direction (extension direction) of the outer panel 22. Since it is difficult to make the orientation direction of all of the carbon fibers 49 correspond with the A direction, the second fiber reinforced plastic member 46 may include carbon fibers 49 that are not aligned with the A direction along their entire orientation direction length. The base material of the second fiber reinforced plastic member 46 is softened when applied with heat and pressure during molding, but since the orientation of the plural carbon fibers 49, these being longer than the carbon fibers 48, is substantially aligned, the base material of the second fiber reinforced plastic member 46 flows less readily when heated than the base material of the first fiber reinforced plastic member 44.

The second fiber reinforced plastic member 46 is formed in a sheet shape including the plural carbon fibers 49. Prior to applying the second fiber reinforced plastic member 46 with heat and pressure, the second fiber reinforced plastic member 46 is configured by a sheet shaped pre-preg in which the plural carbon fibers 49 oriented in the A direction are impregnated with the base material resin. Since the second fiber reinforced plastic member 46 is configured such that the orientation of the plural carbon fibers 49 is aligned in the A direction, the second fiber reinforced plastic member 46 may be considered to be a single-layer CFRP. The second fiber reinforced plastic member 46 has a thickness of t3 (mm) in the B direction.

In the first exemplary embodiment, the thickness t1 of the adhesive sheet 42, the thickness t2 of the first fiber reinforced plastic member 44, and the thickness t3 of the second fiber reinforced plastic member 46 have a relationship in which $t1<t3<t2$. As viewed along the B direction, the surface area of the adhesive sheet 42, the surface area of the first fiber reinforced plastic member 44, and the surface area of the second fiber reinforced plastic member 46 are approximately the same as each other. Namely, if the overall size of the reinforcement member 43 is taken to be 100%, the size of the first fiber reinforced plastic member 44 makes up more than 50% of the overall size of the reinforcement member 43.

As described above, the B direction thickness t3 of the second fiber reinforced plastic member 46 is thinner than the thickness t2 of the first fiber reinforced plastic member 44. The second fiber reinforced plastic member 46 is sandwiched between the adhesive sheet 42 and the first fiber reinforced plastic member 44 in the B direction.

Figure 5A:
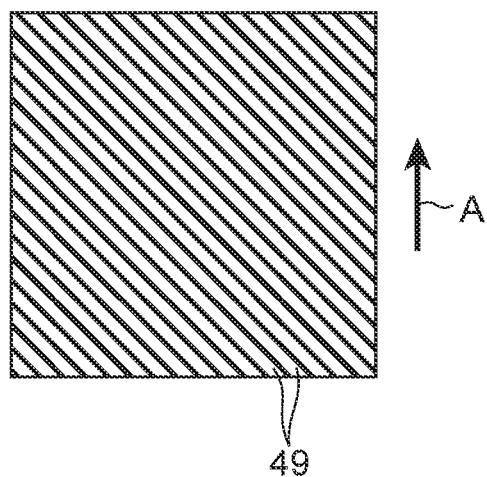
FIG. 5A is a schematic diagram illustrating a state in which carbon fibers are oriented in a fiber direction of −45° in the first exemplary embodiment.
Figure 5B:
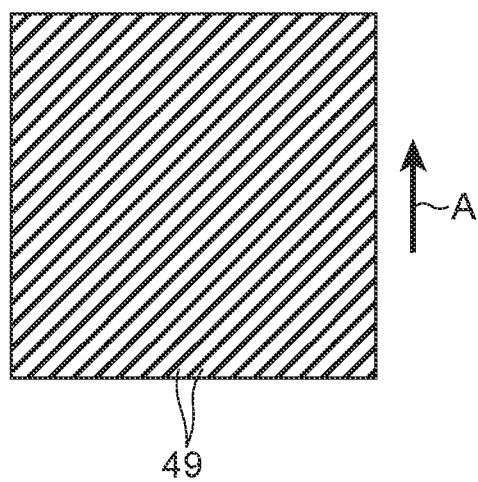
FIG. 5B is a schematic diagram illustrating a state in which carbon fibers are oriented in a fiber direction of 45° in the first exemplary embodiment.
Figure 5C:
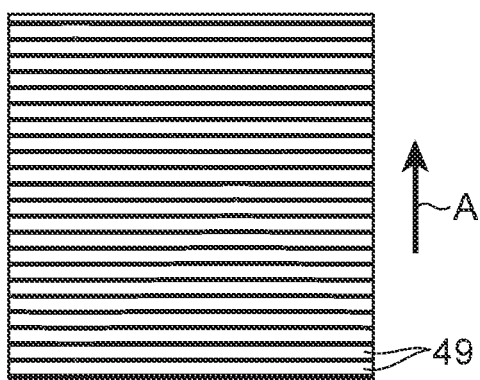
FIG. 5C is a schematic diagram illustrating a state in which carbon fibers are oriented in a fiber direction of 90° in the first exemplary embodiment.
Figure 5D:
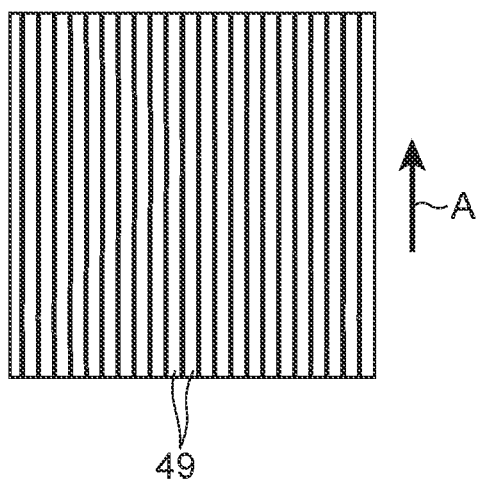
FIG. 5D is a schematic diagram illustrating a state in which carbon fibers are oriented in a fiber direction of 0° in the first exemplary embodiment.

FIG. 5D illustrates a state in which the plural carbon fibers 49 are oriented in the A direction. Note that the A direction refers to a 0° direction, serving as a reference. FIG. 5A illustrates a state in which the plural carbon fibers 49 are oriented in a direction at −45° with respect to the 0° direction. FIG. 5B illustrates a state in which the plural carbon fibers 49 are oriented in a direction at 45° with respect to the 0° direction. FIG. 5C illustrates a state in which the plural carbon fibers 49 are oriented in a direction at 90° with respect to the 0° direction. In the first exemplary embodiment, as an example, the plural carbon fibers 49 are oriented in the A direction (0° direction). However, as illustrated in FIG. 5A, FIG. 5B, and FIG. 5C, the plural carbon fibers 49 may be oriented in other directions than the 0° direction.

Figure 6:
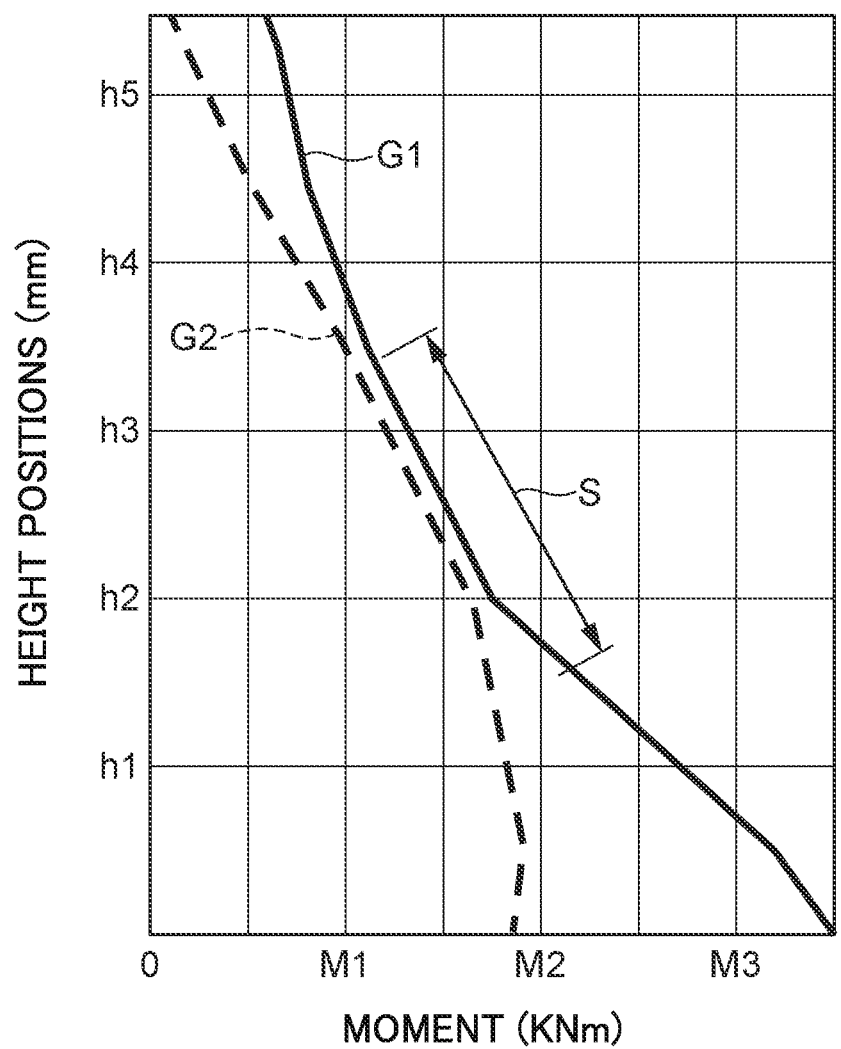
FIG. 6 is a graph illustrating respective relationships between cross-sectional force withstand ability of the center pillar according to the first exemplary embodiment and side collision input, and moment and height positions.

FIG. 6 illustrates respective relationships between cross-sectional force withstand ability of the center pillar 18 (see FIG. 2) and side collision input to the center pillar 18 in a side collision, and moment M (KNm) and height positions h (mm). FIG. 6 illustrates an example of results obtained using Computer Aided Engineering (CAE) analysis. The cross-sectional force withstand ability of the center pillar 18 is illustrated by the graph G1. The side collision input to the center pillar 18 is illustrated by the graph G2.

A range in which the graph G1 and the graph G2 are close to each other is considered to be a range in which the force withstand ability in a side collision is comparatively weak. As an example, in FIG. 6, a range S spanning from between the height positions h1 and h2 to between the height positions h3 and h4 of the center pillar 18 is a location where buckling deformation may be expected to occur in a side collision (i.e., a location where force withstand ability in a side collision is comparatively weak).

In the outer panel 22 illustrated in FIG. 3, as an example, the adhesive sheet 42, the first fiber reinforced plastic member 44, and the second fiber reinforced plastic member 46 are provided in a range corresponding to the height direction range S (see FIG. 6). Note that, as an example, the outer panel 22 is not provided with the adhesive sheet 42, the first fiber reinforced plastic member 44, and the second fiber reinforced plastic member 46 outside of the range S.

Operation and Effects

Next, explanation follows regarding operation and effects of the vehicle frame structure 40 of the first exemplary embodiment.

Vehicle Frame Structure Manufacturing Method

Figure 7A:
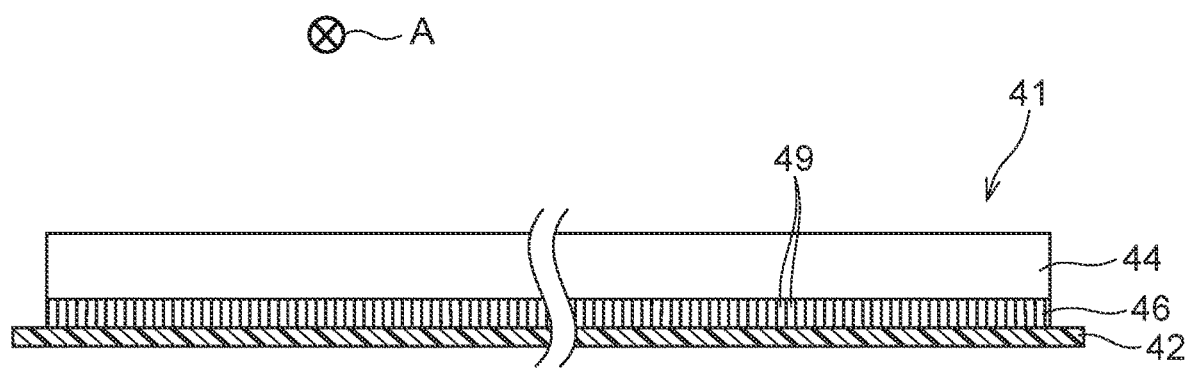
FIG. 7A is a schematic explanatory diagram illustrating a configuration of layers in a stacked body according to the first exemplary embodiment.

As illustrated in FIG. 7A, the second fiber reinforced plastic member 46 is superimposed on the adhesive sheet 42, and then the first fiber reinforced plastic member 44 is superimposed on the second fiber reinforced plastic member 46. Note that the plural carbon fibers 48 (see FIG. 4) are omitted from illustration in FIG. 7. The first fiber reinforced plastic member 44 is formed in a sheet shape in advance by a molding method employing a sheet molding compound (SMC).

In the first fiber reinforced plastic member 44, the plural carbon fibers 48 (see FIG. 4) are randomly oriented. The second fiber reinforced plastic member 46 is formed in a single-layer sheet shape in advance by impregnating the plural carbon fibers 49 oriented in the A direction with the resin configuring the base material. When in a stacked state not adhered to the outer panel 22 (see FIG. 3), the adhesive sheet 42, the second fiber reinforced plastic member 46, and the first fiber reinforced plastic member 44 are referred to as a stacked body 41.

Figure 7B:
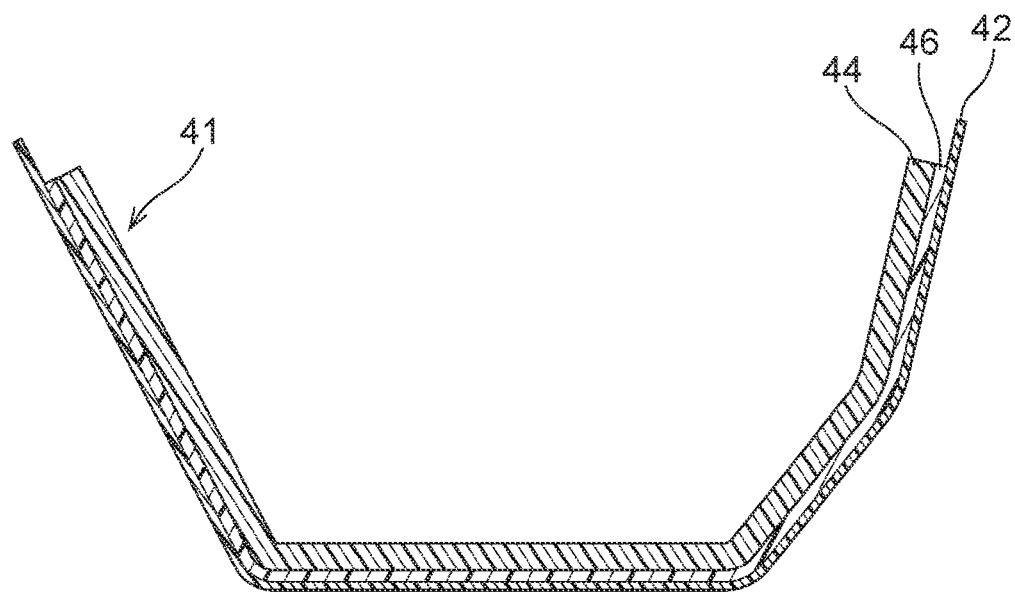
FIG. 7B is a schematic explanatory diagram illustrating a preform according to the first exemplary embodiment.

As illustrated in FIG. 7B, the stacked body 41 is preformed into a shape similar to that of the outer panel 22 (see FIG. 3) by being softened by heating and applied with pressure using a thermostatic chamber and a simple mold, not illustrated in the drawings.

Figure 8A:
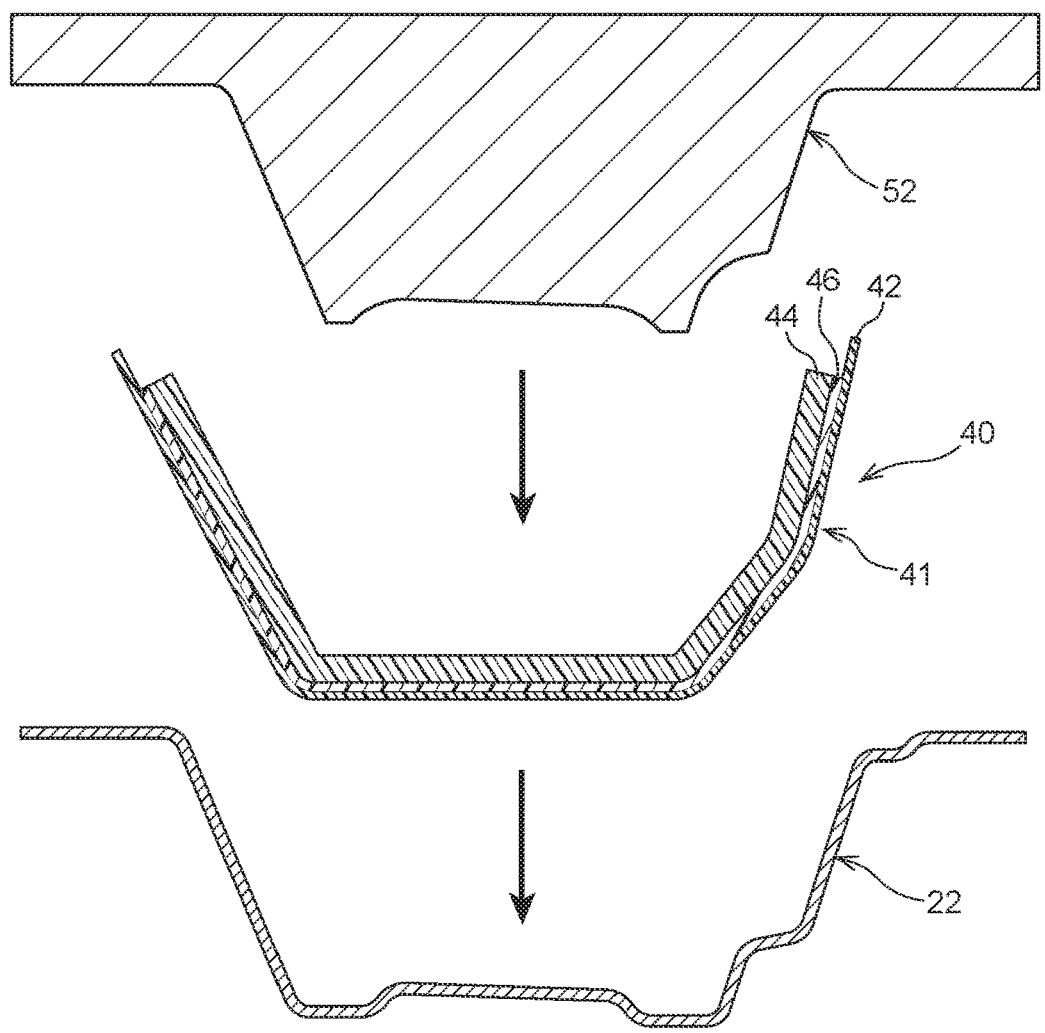
FIG. 8A is an explanatory diagram illustrating a state in which the preform according to the first exemplary embodiment is sandwiched between an upper mold and an outer panel.

As illustrated in FIG. 8A, the outer panel 22 to be reinforced is employed as a lower mold. The stacked body 41 (preform) is disposed inside the outer panel 22. The stacked body 41 is then sandwiched between the outer panel 22 and an upper mold 52, and applied with heat and pressure to undergo molding. Namely, the vehicle frame structure 40 is formed. The adhesive sheet 42 melts due to being heated. The second fiber reinforced plastic member 46 has a larger inter-fiber contact surface area than the first fiber reinforced plastic member 44 due to the orientation of the plural carbon fibers 49 (see FIG. 3) being aligned. Namely, the second fiber reinforced plastic member 46 has a larger contact surface area between the base material and the plural carbon fibers 49 than the first fiber reinforced plastic member 44. Accordingly, the resin base material of the second fiber reinforced plastic member 46 does not readily flow in directions intersecting the orientation direction of the fibers than the first fiber reinforced plastic member 44. Accordingly, the second fiber reinforced plastic member 46 is more capable of suppressing the molten adhesive sheet 42 from flowing together with the resin base material than a configuration in which the first fiber reinforced plastic member 44 and the adhesive sheet 42 are in contact with each other.

Figure 8B:
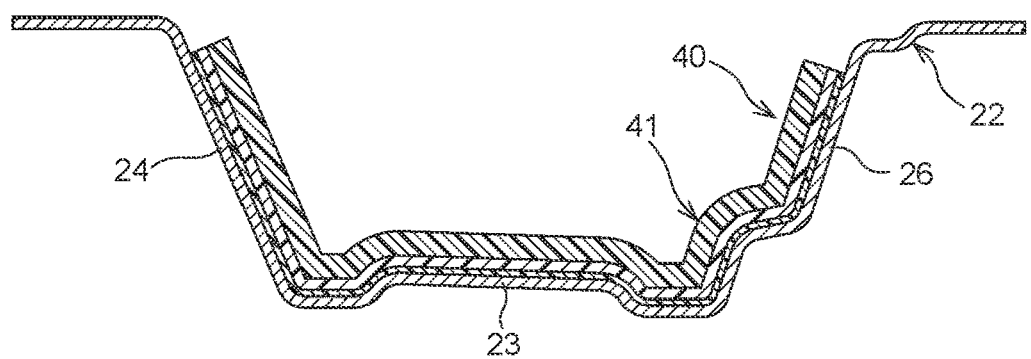
FIG. 8B is an explanatory diagram illustrating a state in which the vehicle frame structure according to the first exemplary embodiment has been removed from a mold.

As illustrated in FIG. 8B, the base materials and the adhesive sheet 42 configuring the stacked body 41 harden by cooling after being heated, thereby adhering the stacked body 41 to the outer panel 22. In other words, the vehicle frame structure 40 is disposed to the outer panel 22. The vehicle frame structure 40 covers inner faces of the side wall 23, the front wall 24, and the rear wall 26 of the outer panel 22.

As illustrated in FIG. 3, the inner panel 32 is superimposed on the outer panel 22 provided with the vehicle frame structure 40 from the vehicle width direction inner side. The front flange 36 and the front flange 25 are spot welded together in the vehicle width direction, and the rear flange 37 and the rear flange 27 are spot welded together in the vehicle width direction, to form the center pillar 18.

As illustrated in FIG. 1, the lower end portion of the center pillar 18 is joined to the rocker 14, and the upper end portion of the center pillar 18 is joined to the roof side rail 16. The vehicle body 12 and the vehicle 10 are formed in this manner.

Operation of Vehicle Frame Structure

In the vehicle 10 illustrated in FIG. 1, a collision load toward the vehicle width direction inner side acts on the center pillar 18 in a side collision with a barrier, not illustrated in the drawings. When collision load acts on the center pillar 18 illustrated in FIG. 3, the vehicle width direction outer side of the outer panel 22 is placed in a compressed state, and the vehicle width direction inner side is placed in a state under tension. Since the outer panel 22 is supported from the vehicle width direction inner side by the vehicle frame structure 40, the outer panel 22 in the vehicle 10 is better suppressed from buckling than in configurations which the vehicle frame structure 40 is not present.

The second fiber reinforced plastic member 46 is more expensive than the first fiber reinforced plastic member 44. However, the thickness of the second fiber reinforced plastic member 46 is thinner than the thickness of the first fiber reinforced plastic member 44, and the second fiber reinforced plastic member 46 is used in a smaller amount in the vehicle frame structure 40. Namely, an increase in cost may be better suppressed in the vehicle frame structure 40 than in a vehicle frame structure employing only the second fiber reinforced plastic member 46.

The second fiber reinforced plastic member 46 that includes the plural oriented carbon fibers 49 (see FIG. 3) has a greater contact surface area between fibers than the first fiber reinforced plastic member 44 that includes the plural carbon fibers 48 (see FIG. 3) oriented in different directions. In other words, when the second fiber reinforced plastic member 46 is heated, the resin base material does not readily flow in directions intersecting the orientation direction of the fibers. Accordingly, the adhesive sheet 42 that is in contact with the second fiber reinforced plastic member 46 is better suppressed from flowing with the resin base material than in cases in which the adhesive sheet 42 is in contact with the first fiber reinforced plastic member 44. A reduction in the adhesiveness between the outer panel 22, and the first fiber reinforced plastic member 44 and the second fiber reinforced plastic member 46 is thus suppressed. Namely, the vehicle frame structure 40 is capable of suppressing an increase in cost and is also capable of suppressing a reduction in the adhesiveness between the outer panel 22, and the first fiber reinforced plastic member 44 and the second fiber reinforced plastic member 46.

In the vehicle frame structure 40, a large collision load in the A direction is liable to act on the outer panel 22 in a side collision. However, in the vehicle frame structure 40, the plural carbon fibers 49 are oriented so as to be aligned along the A direction, thereby suppressing a reduction in bending rigidity to collision load acting in the A direction, enabling deformation of the outer panel 22 to be suppressed.

Moreover, in the vehicle frame structure 40, the first fiber reinforced plastic member 44 and the second fiber reinforced plastic member 46 (reinforcement member 43) are provided to the center pillar 18 on which a large bending load is liable to act in a side collision. This thereby enables a reduction in the bending rigidity of the center pillar 18 under collision load acting in a collision direction to be suppressed, while suppressing an increase in cost and a reduction in adhesiveness.

In cases in which the reinforcement member 43 is configured by the first fiber reinforced plastic member 44 alone, the material strength would be lower than the cases in which the reinforcement member 43 is configured by the second fiber reinforced plastic member 46 alone. However, the reinforcement member 43 includes the second fiber reinforced plastic member 46 in addition to the first fiber reinforced plastic member 44. Accordingly, in the vehicle frame structure 40, a reduction in the material strength may be better suppressed than in cases in which the reinforcement member 43 is configured by the first fiber reinforced plastic member 44 alone.

Second Exemplary Embodiment

Explanation follows regarding a vehicle frame structure 60 according to a second exemplary embodiment.

Figure 9:
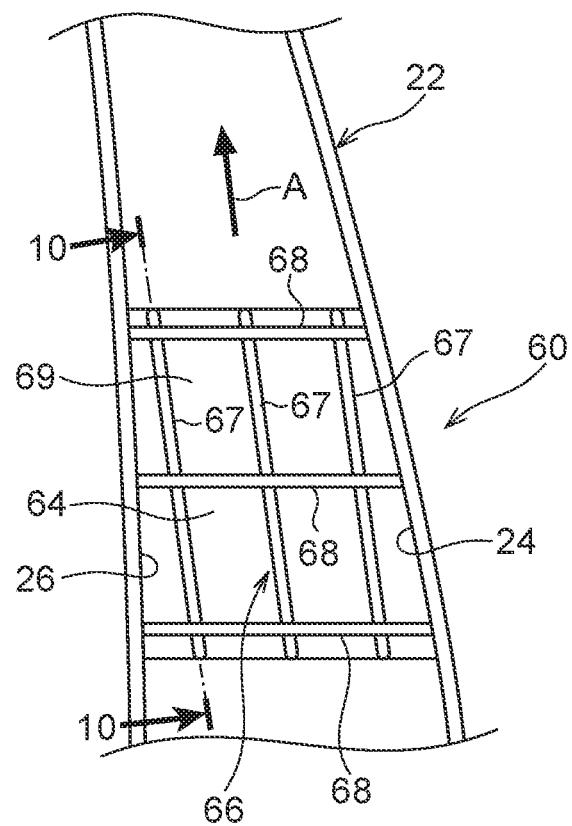
FIG. 9 is a side view illustrating a state in which a projection portion has been formed to a second fiber reinforced plastic member of a center pillar according to a second exemplary embodiment.

FIG. 9 illustrates a vehicle frame structure 60 according to the second exemplary embodiment, provided to the vehicle 10 (see FIG. 1) instead of the vehicle frame structure 40 (see FIG. 3). Configurations similar to those of the first exemplary embodiment are allocated the same reference numerals, and explanation thereof is omitted.

FIG. 9 illustrates a state in which the outer panel 22 is viewed from the vehicle width direction inner side. The outer panel 22 is provided with the vehicle frame structure 60. Note that the vehicle frame structure 60 is provided to the outer panel 22 in a range corresponding to the range S described previously (see FIG. 6). The vehicle frame structure 60 is simplified in FIG. 9.

Figure 10:
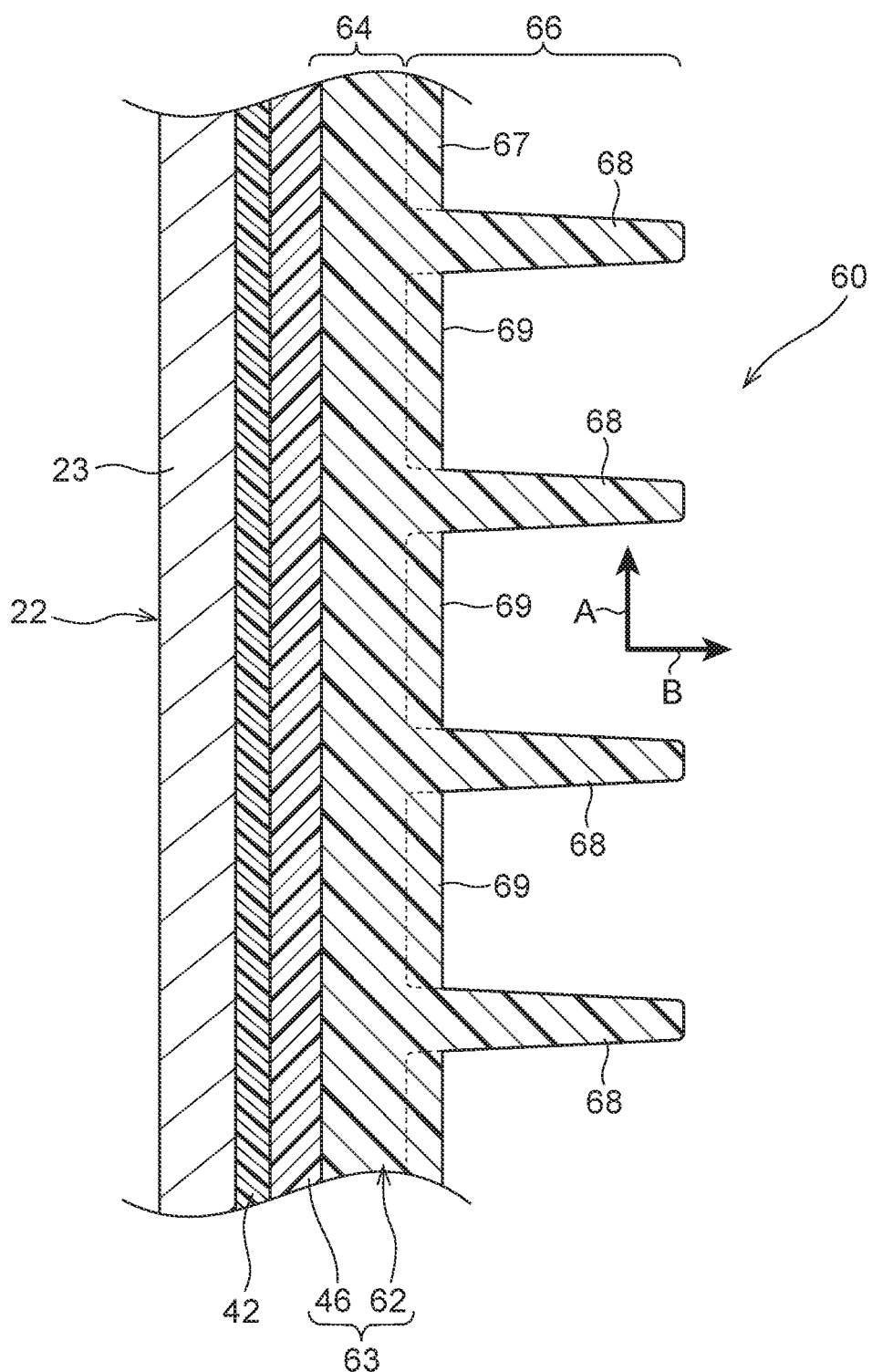
FIG. 10 is a vertical cross-section (a cross-section taken along line 10-10 in FIG. 9) illustrating an outer panel of the center pillar according to the second exemplary embodiment.

As illustrated in FIG. 10, the vehicle frame structure 60 includes the adhesive sheet 42, a first fiber reinforced plastic member 62, and the second fiber reinforced plastic member 46. In other words, the vehicle frame structure 60 is configured by a vehicle frame structure 40 (see FIG. 3) in which the first fiber reinforced plastic member 44 (see FIG. 3) is replaced by the first fiber reinforced plastic member 62. Specifically, the outer panel 22 is provided by superimposing the adhesive sheet 42, the second fiber reinforced plastic member 46, and the first fiber reinforced plastic member 62 in this sequence on the side wall 23, the front wall 24, and the rear wall 26 (see FIG. 3) from the vehicle width direction inner side. Note that the first fiber reinforced plastic member 62 and the second fiber reinforced plastic member 46 are referred to collectively as a reinforcement member 63.

First Fiber Reinforced Plastic Member

The first fiber reinforced plastic member 62 is, for example, configured by a CFRP in which plural, non-continuous carbon fibers 48 (see FIG. 3) are embedded with random orientation in a base material configured by an unsaturated polyester resin. Namely, the first fiber reinforced plastic member 62 is configured by a similar material to the first fiber reinforced plastic member 44 (see FIG. 3). However, the first fiber reinforced plastic member 62 has a different shape to the first fiber reinforced plastic member 44. Specifically, in the first fiber reinforced plastic member 62, a projecting portion 66 is formed projecting in the B direction (i.e., toward the vehicle width direction inner side) from a base portion 64 that is in close contact with the second fiber reinforced plastic member 46. The projecting portion 66 is an example of a thickened portion.

Base Portion

The base portion 64 is, for example, formed in a sheet shape that is thicker than the second fiber reinforced plastic member 46 in a hardened state. When viewed from the vehicle width direction inner side, the base portion 64 has a size that covers the second fiber reinforced plastic member 46. The base portion 64 is provided to the side wall 23, the front wall 24, and the rear wall 26 (see FIG. 3) of the outer panel 22.

Projecting Portion

The projecting portion 66 is formed only in a range alongside the side wall 23 in the B direction, and is not provided to the front wall 24 and the rear wall 26 (see FIG. 3). For example, the projecting portion 66 includes plural vertical ribs 67 and plural horizontal ribs 68 that intersect the plural vertical ribs 67 so as to form a lattice of parallelogram shapes together with the plural vertical ribs 67. The plural vertical ribs 67 and the plural horizontal ribs 68 are an example of plural ribs. The vehicle width direction height of the horizontal ribs 68 is greater than the vehicle width direction height of the vertical ribs 67. Spaces between the plural vertical ribs 67 and the plural horizontal ribs 68 configure recesses 69. The recesses 69 are considered an example of an absent portion where the projecting portion 66 serving as a thickened portion is locally absent.

As illustrated in FIG. 9, the plural vertical ribs 67 have their thickness in the vehicle front-rear direction and are formed in plate shapes extending along the A direction as viewed from the vehicle width direction inner side. The plural vertical ribs 67 extend from a lower end to an upper end of the range S (see FIG. 6). Moreover, the plural vertical ribs 67 are disposed spaced apart from each other in the vehicle front-rear direction that intersects the A direction. In FIG. 9, three vertical ribs 67 are illustrated; however, one, two, or four or more of the vertical ribs 67 may be provided.

As viewed from the vehicle width direction inner side, the plural horizontal ribs 68 have their thickness in the vehicle vertical direction and are formed in plate shapes extending along the vehicle front-rear direction that intersects the A direction. Moreover, the plural horizontal ribs 68 extend between the front wall 24 and the rear wall 26, and are coupled to the front wall 24 and the rear wall 26 in order to suppress cross-sectional deformation. The plural horizontal ribs 68 are disposed spaced apart from each other in the A direction. One horizontal rib 68 out of the plural horizontal ribs 68 is disposed at substantially the A direction center (buckling center) of the range S. FIG. 9 is simplified so as to illustrate three horizontal ribs 68; however one, two, or four or more of the horizontal ribs 68 may be provided.

Operation and Effects

Next, explanation follows regarding operation and effects of the vehicle frame structure 60 of the second exemplary embodiment.

In the vehicle frame structure 60 illustrated in FIG. 9 and FIG. 10, the second fiber reinforced plastic member 46 is more expensive than the first fiber reinforced plastic member 62. However, the thickness of the second fiber reinforced plastic member 46 is thinner than the thickness of the first fiber reinforced plastic member 62, and is used in a smaller amount in the vehicle frame structure 60. Namely, an increase in cost may be better suppressed in the vehicle frame structure 60 than in a vehicle frame structure employing only the second fiber reinforced plastic member 46.

Moreover, the second fiber reinforced plastic member 46 that includes the plural oriented carbon fibers 49 (see FIG. 3) has a greater contact surface area between fibers than the first fiber reinforced plastic member 62 that includes the plural carbon fibers 48 (see FIG. 3) oriented in different directions. In other words, when the second fiber reinforced plastic member 46 is heated, the resin base material does not readily flow in directions intersecting the orientation direction of the fibers. Accordingly, the adhesive sheet 42 that is in contact with the second fiber reinforced plastic member 46 is better suppressed from flowing with the resin base material than in cases in which the adhesive sheet 42 is in contact with the first fiber reinforced plastic member 62. A reduction in the adhesiveness between the outer panel 22, and the first fiber reinforced plastic member 62 and the second fiber reinforced plastic member 46 is thus suppressed. Namely, the vehicle frame structure 60 is capable of suppressing an increase in cost, and is also capable of suppressing a reduction in the adhesiveness between the outer panel 22, and the first fiber reinforced plastic member 62 and the second fiber reinforced plastic member 46.

The vehicle frame structure 60 is formed with the plural vertical ribs 67 and the plural horizontal ribs 68 at a location within the range S. In a side collision of the vehicle 10, the plural vertical ribs 67 and the plural horizontal ribs 68 resist collision load acting on the outer panel 22, enabling buckling deformation of the outer panel 22 to be better suppressed than in configurations not including the vertical ribs 67 and the horizontal ribs 68. Moreover, the recesses 69 in which the first fiber reinforced plastic member 62 is not present are configured between the plural vertical ribs 67 and the plural horizontal ribs 68, enabling the weight of the vehicle frame structure 60 to be reduced compared to configurations not including the vertical ribs 67 and the horizontal ribs 68. Namely, the vehicle frame structure 60 is capable of suppressing buckling deformation of the outer panel 22 and of reducing the weight of the vehicle frame structure 60.

Specifically, in the reinforcement member 63 illustrated in FIG. 10, the plural carbon fibers 49 (see FIG. 4) are configured by continuous fibers running along the A direction, thereby suppressing a reduction in force withstand ability against load acting along the A direction in a side collision. The first fiber reinforced plastic member 62 is configured by the plural, randomly oriented carbon fibers 48 (see FIG. 4), and therefore has lower force withstand ability than the second fiber reinforced plastic member 46. However, the first fiber reinforced plastic member 62 includes the projecting portion 66, and the projecting portion 66 resists collision load acting thereon, thereby suppressing a reduction in the force withstand ability of the first fiber reinforced plastic member 62 overall. In this manner, in the vehicle frame structure 60, a reduction in force withstand ability is suppressed in both the first fiber reinforced plastic member 62 and the second fiber reinforced plastic member 46, enabling buckling deformation of the overall outer panel 22 to be suppressed.

Third Exemplary Embodiment

Explanation follows regarding a vehicle frame structure 70 according to a third exemplary embodiment.

Figure 11:
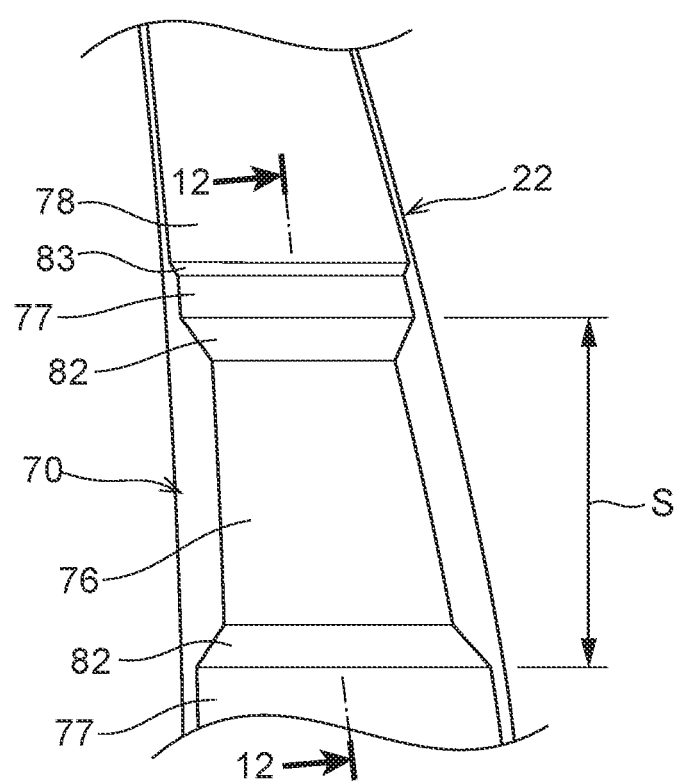
FIG. 11 is a side view illustrating a state in which a thickened portion and a thinned portion have been formed to a second fiber reinforced plastic member of a center pillar according to a third exemplary embodiment.

FIG. 11 illustrates the vehicle frame structure 70 according to the third exemplary embodiment, provided to the vehicle 10 (see FIG. 1) instead of the vehicle frame structure 40 (see FIG. 3). Configurations similar to those of the first exemplary embodiment are allocated the same reference numerals, and explanation thereof is omitted.

FIG. 11 illustrates a state in which the outer panel 22 is viewed from the vehicle width direction inner side. The outer panel 22 is provided with the vehicle frame structure 70. Note that the majority of the range in which vehicle frame structure 70 is provided to the outer panel 22 is within the range S described previously.

Figure 12:
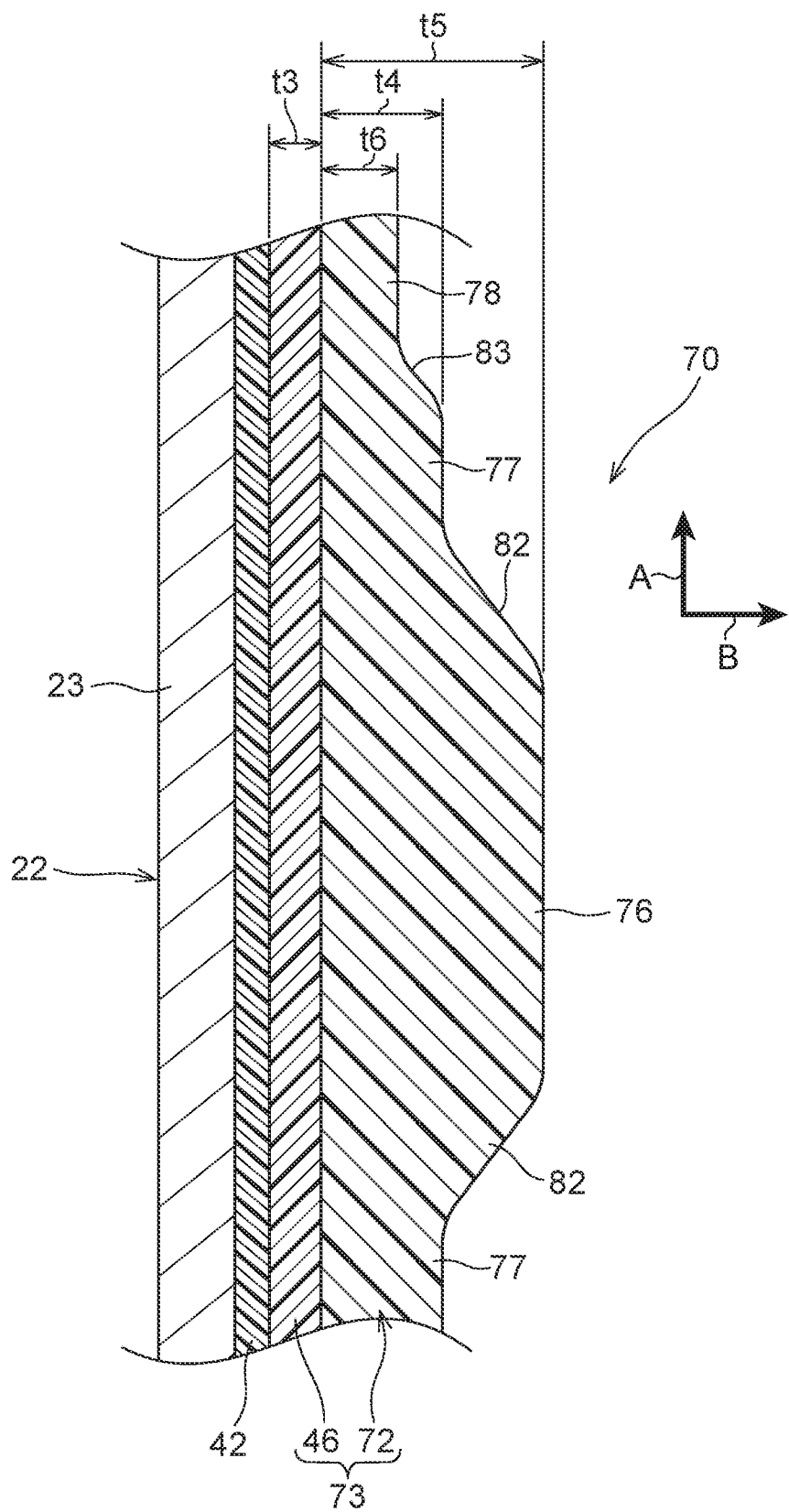
FIG. 12 is a vertical cross-section (a cross-section taken along line 12-12 in FIG. 11) illustrating an outer panel of the center pillar according to the third exemplary embodiment.

The vehicle frame structure 70 illustrated in FIG. 12 includes the adhesive sheet 42, a first fiber reinforced plastic member 72, and the second fiber reinforced plastic member 46. In other words, the vehicle frame structure 70 is configured by a vehicle frame structure 40 (see FIG. 3) in which the first fiber reinforced plastic member 44 (see FIG. 3) is replaced by the first fiber reinforced plastic member 72. Specifically, the outer panel 22 is provided by superimposing the adhesive sheet 42, the second fiber reinforced plastic member 46, and the first fiber reinforced plastic member 72 in this sequence on the side wall 23, the front wall 24, and the rear wall 26 (see FIG. 3) from the vehicle width direction inner side. Note that the first fiber reinforced plastic member 72 and the second fiber reinforced plastic member 46 are referred to collectively as a reinforcement member 73.

First Fiber Reinforced Plastic Member

The first fiber reinforced plastic member 72 is, for example, configured by a CFRP in which plural, non-continuous carbon fibers 48 (see FIG. 3) are embedded with random orientation in a base material configured by an unsaturated polyester resin. Namely, the first fiber reinforced plastic member 72 is configured by a similar material to the first fiber reinforced plastic member 44 (see FIG. 3). However, as described later, the first fiber reinforced plastic member 72 has a different shape to the first fiber reinforced plastic member 44. The first fiber reinforced plastic member 72 is in close contact with the second fiber reinforced plastic member 46.

For example, the first fiber reinforced plastic member 72 is formed in a sheet shape that has a thicker thickness in the B direction than the second fiber reinforced plastic member 46 in a hardened state. When viewed from the vehicle width direction inner side, the first fiber reinforced plastic member 72 has a size that covers the second fiber reinforced plastic member 46. In other words, the first fiber reinforced plastic member 72 is provided to the side wall 23, and to the front wall 24 and the rear wall 26 (see FIG. 3) of the outer panel 22. In addition, the first fiber reinforced plastic member 72 is formed with a thickened portion 76, a peripheral portion 77, and a thinned portion 78.

Peripheral Portion

The peripheral portion 77 refers to a location positioned at the periphery of the thickened portion 76 as viewed along the B direction. The peripheral portion 77 is a location configuring a base of the first fiber reinforced plastic member 72, and has a thickness of t4 (mm), this being the average thickness of the first fiber reinforced plastic member 72. The thickness t4 is greater than the thickness t3 of the second fiber reinforced plastic member 46. The peripheral portion 77 is positioned outside the range S (see FIG. 11).

Thickened Portion

The thickened portion 76 is a location with a B direction thickness of t5 (mm) that is greater than the thickness t4 of the peripheral portion 77. The thickened portion 76 is positioned within the range S so as to encompass the center of the range S. The thickened portion 76 is formed from the front wall 24 to the rear wall 26 (see FIG. 3).

Thinned Portion

The thinned portion 78 is a location with a B direction thickness of t6 (mm) that is at least thinner than the thickness t4 of the peripheral portion 77. The thinned portion 78 is positioned outside the range S. The thinned portion 78 is formed from the front wall 24 to the rear wall 26 (see FIG. 3). An inclined wall 82 and an inclined wall 83 respectively connect (i.e., provide continuity) between the thickened portion 76 and the peripheral portion 77 and between the peripheral portion 77 and the thinned portion 78.

Operation and Effects

Next, explanation follows regarding operation and effects of the vehicle frame structure 70 of the third exemplary embodiment.

In the vehicle frame structure 70 illustrated in FIG. 11 and FIG. 12, the second fiber reinforced plastic member 46 is more expensive than the first fiber reinforced plastic member 72. However, the thickness of the second fiber reinforced plastic member 46 is thinner than the thickness of the first fiber reinforced plastic member 72, and is used in a smaller amount in the vehicle frame structure 70. Namely, an increase in cost may be better suppressed in the vehicle frame structure 70 than in a vehicle frame structure employing only the second fiber reinforced plastic member 46.

Moreover, the second fiber reinforced plastic member 46 that includes the plural, oriented carbon fibers 49 (see FIG. 3) has a greater contact surface area between fibers than the first fiber reinforced plastic member 72 that includes the plural carbon fibers 48 (see FIG. 3) oriented in different directions. In other words, when the second fiber reinforced plastic member 46 is heated, the resin base material does not readily flow in directions intersecting the orientation direction of the fibers. Accordingly, the adhesive sheet 42 that is in contact with the second fiber reinforced plastic member 46 is better suppressed from flowing with the resin base material than in cases in which the adhesive sheet 42 is in contact with the first fiber reinforced plastic member 72. A reduction in the adhesiveness between the outer panel 22, and the first fiber reinforced plastic member 72 and the second fiber reinforced plastic member 46 is thus suppressed. Namely, the vehicle frame structure 70 is capable of suppressing an increase in cost and is also capable of suppressing a reduction in the adhesiveness between the outer panel 22, and the first fiber reinforced plastic member 72 and the second fiber reinforced plastic member 46.

In the vehicle frame structure 70, the thickened portion 76 is formed to the first fiber reinforced plastic member 72. In a side collision, the thickened portion 76 that is thicker than the peripheral portion 77 configuring the base resists collision load acting on the outer panel 22, enabling buckling deformation of the outer panel 22 to be better suppressed than in configurations not including the thickened portion 76.

As described above, the vehicle frame structure 70 is locally reinforced by the thickened portion 76, thereby increasing the bending rigidity with respect to collision load acting in a collision direction. In other words, as viewed along the B direction, it is possible to reduce the bending rigidity at a location at the outer side of the peripheral portion 77. Forming the thinned portion 78 at the outer side of the peripheral portion 77 enables a reduction in weight of the outer panel 22 (center pillar 18), while still suppressing a reduction in bending rigidity.

Figure 13:
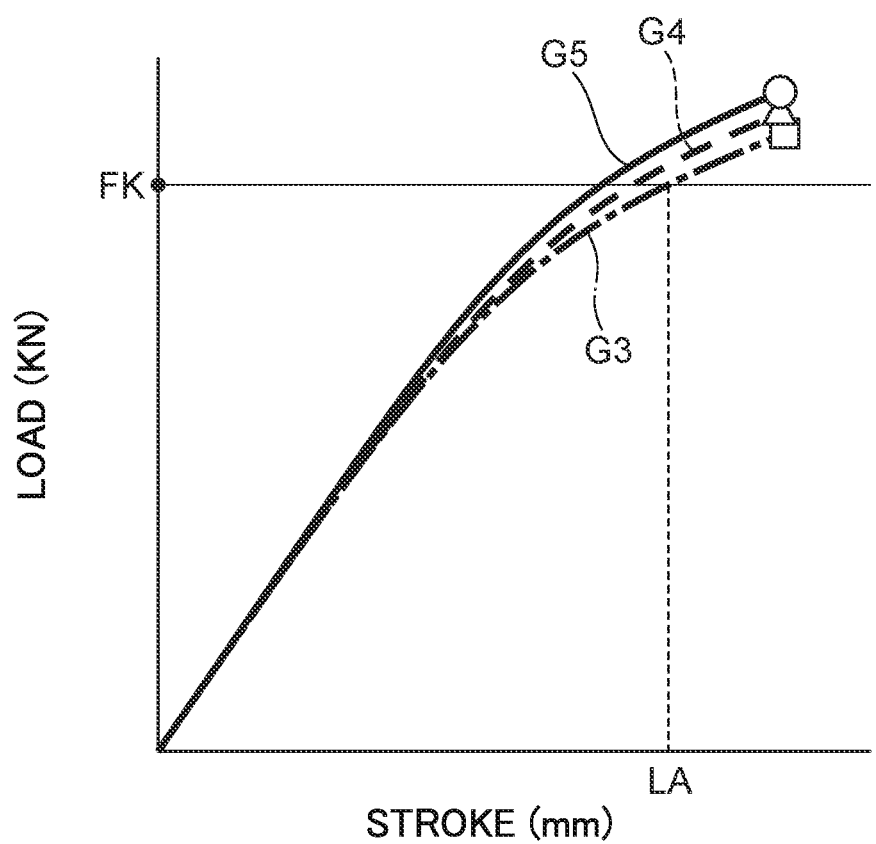
FIG. 13 is a graph illustrating relationships between stroke and load when center pillars applied with the vehicle frame structures of respective exemplary embodiments are deformed.

FIG. 13 illustrates the results of CAE analysis of the relationships between stroke (mm) and load (KN) in the center pillar 18 (see FIG. 2) when provided with the vehicle frame structure 40 (see FIG. 3), the vehicle frame structure 60 (see FIG. 10), and the vehicle frame structure 70 (see FIG. 12). The graph G3 in FIG. 13 represents characteristics of the vehicle frame structure 40. The graph G4 represents characteristics of the vehicle frame structure 60.

The graph G5 represents characteristics of the vehicle frame structure 70.

When compared based on the same stroke, the graph G4 exhibits higher load than the graph G3. The graph G5 exhibits higher load than the graph G4. However, in each of the graph G3, the graph G4, and the graph G5, the load is at least a target load FK at a stroke LA (mm). Accordingly, buckling deformation of the center pillar 18 due to collision load is suppressed in side collisions.

MODIFIED EXAMPLES

The present disclosure is not limited to the exemplary embodiments described above. Explanation follows regarding various modified examples. Note that in the description of the modified examples, configurations similar to those of the first, second, and third exemplary embodiments described above are allocated the same reference numerals and explanation thereof is omitted. Similar configurations are not limited to identical configurations, and include configurations with local differences in shape but obtaining similar operation overall.

First Modified Example

FIG. 14 illustrates a center pillar 80. The center pillar 80 includes the outer panel 22, the inner panel 32, and pillar reinforcement 82 serving as an example of a vehicle frame member. The pillar reinforcement 82 is disposed between the outer panel 22 and the inner panel 32 as viewed along the vehicle vertical direction, and is joined to the outer panel 22 and the inner panel 32 so as to reinforce the center pillar 80.

As viewed along the vehicle vertical direction, the pillar reinforcement 82 is formed with a hat-shaped cross-section profile opening toward the vehicle width direction inner side. The vehicle frame structure 40 is provided to an inner face of the pillar reinforcement 82. The vehicle frame structure 40 may be provided to the pillar reinforcement 82 instead of the outer panel 22 in this manner. The configuration of the first modified example is capable of suppressing an increase in cost and also capable of suppressing a reduction in the adhesiveness between the pillar reinforcement 82 and the respective fiber reinforced plastic members.

Second Modified Example

Figure 15A:
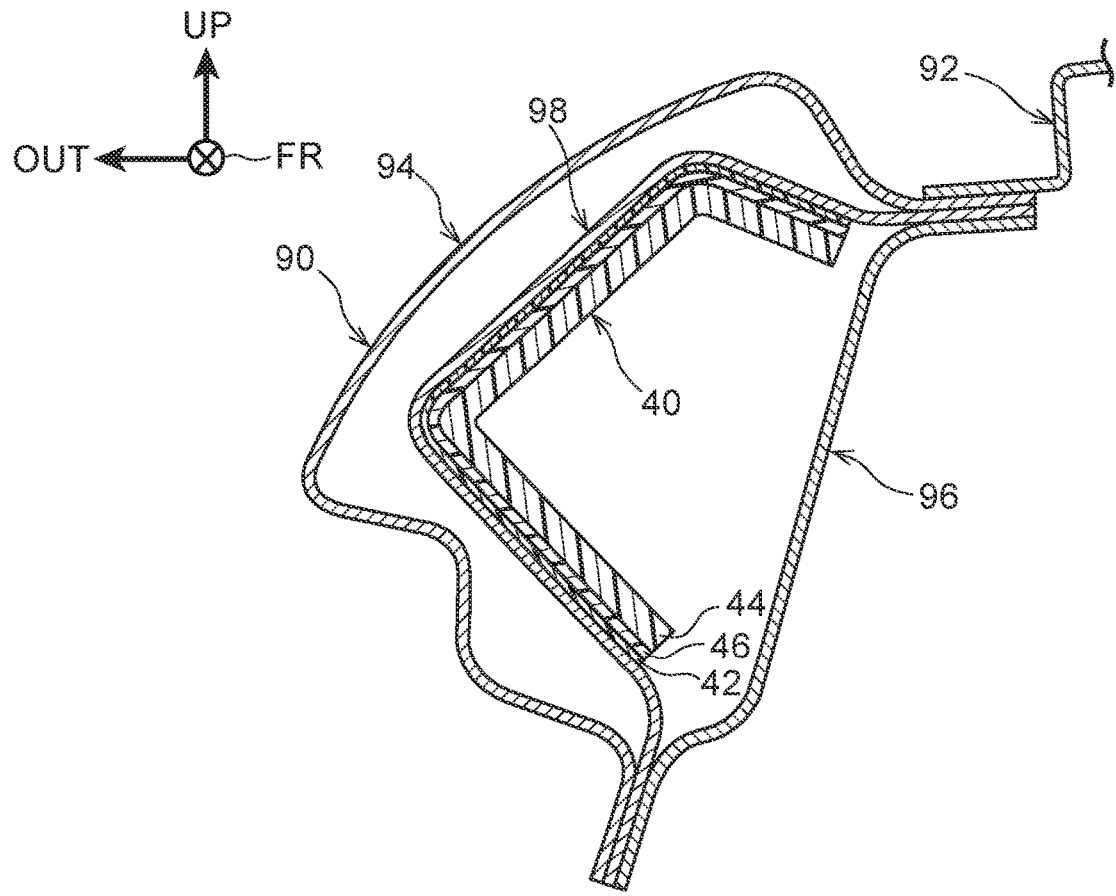
FIG. 15A is a vertical cross-section illustrating a roof side rail according to a second modified example.

FIG. 15A illustrates a roof side rail 90. The roof side rail 90 is joined to a roof panel 92. The roof side rail 90 includes an outer panel 94, an inner panel 96, and roof side rail reinforcement 98 serving as an example of a vehicle frame member. As viewed along the vehicle front-rear direction, the roof side rail reinforcement 98 is disposed between the outer panel 94 and the inner panel 96 and joined to the outer panel 94 and the inner panel 96 so as to reinforce the roof side rail 90.

As viewed along the vehicle vertical direction, the roof side rail reinforcement 98 is formed with a hat-shaped cross-section profile opening toward the vehicle width direction inner side. The vehicle frame structure 40 is provided at an inner face of the roof side rail reinforcement 98. The vehicle frame structure 40 may be provided to the roof side rail reinforcement 98 in this manner. The configuration of the second modified example is capable of suppressing an increase in cost and also capable of suppressing a reduction in the adhesiveness between the roof side rail reinforcement 98 and the respective fiber reinforced plastic members.

Third Modified Example

Figure 15B:
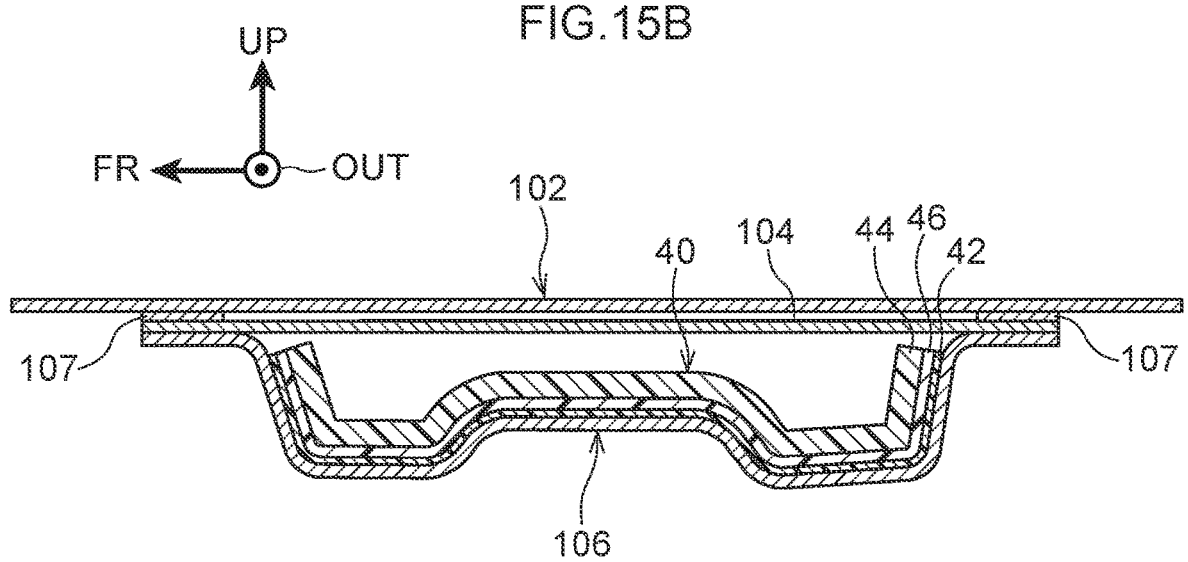
FIG. 15B is a vertical cross-section illustrating a roof panel and roof reinforcement according to a third modified example.

FIG. 15B illustrates a state in which an upper panel 104 and roof reinforcement 106 are joined to a roof panel 102.

The upper panel 104 is joined to a lower face of the roof panel 102 by a mastic adhesive 107. The roof reinforcement 106 is an example of a vehicle frame member, and is superimposed on the upper panel 104 from the lower side and joined to the upper panel 104 by spot welding so as to reinforce the roof panel 102.

As viewed along the vehicle width direction, the roof reinforcement 106 is formed with a hat-shaped cross-section profile opening toward the vehicle upper side. The vehicle frame structure 40 is provided to an inner face of the roof reinforcement 106. The vehicle frame structure 40 may be provided to the roof reinforcement 106 in this manner. The configuration of the third modified example is capable of suppressing an increase in cost and also capable of suppressing a reduction in the adhesiveness between the roof reinforcement 106 and the respective fiber reinforced plastic members.

Fourth Modified Example

Figure 16A:
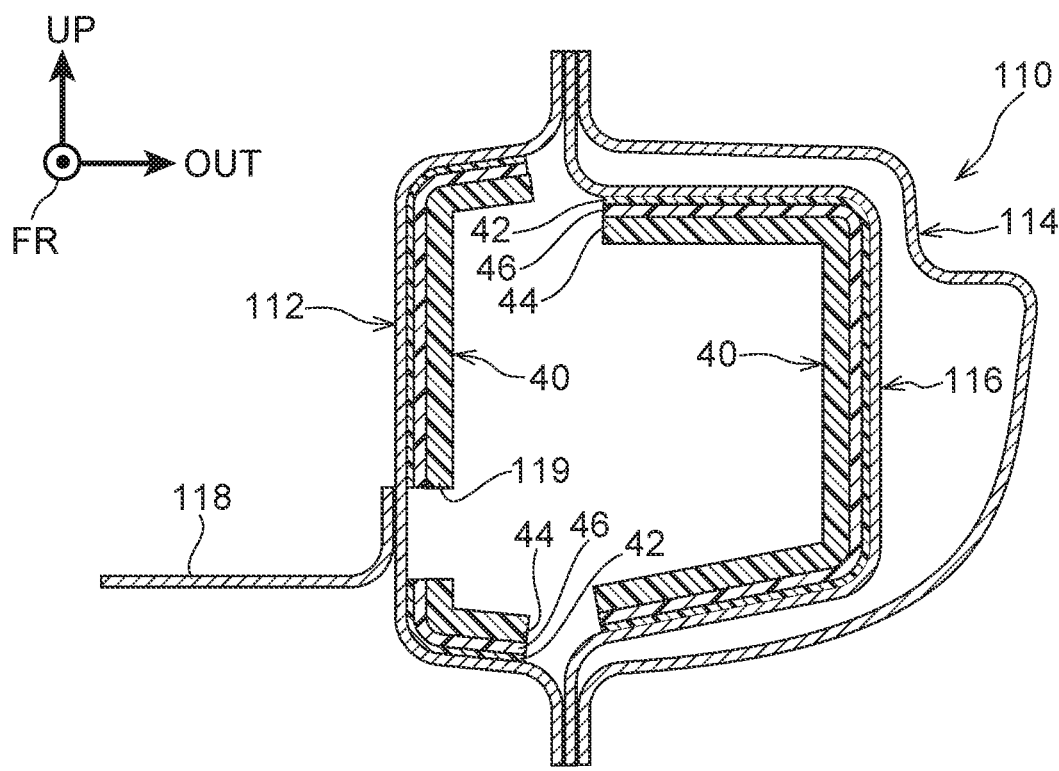
FIG. 16A is a vertical cross-section illustrating a rocker according to a fourth modified example.

FIG. 16A illustrates a rocker 110. The rocker 110 includes a rocker inner panel 112 serving as an example of a vehicle frame member, a rocker outer panel 114, and rocker reinforcement 116 serving as an example of a vehicle frame member.

As viewed along the vehicle front-rear direction, the rocker inner panel 112 is formed with a hat-shaped cross-section profile opening toward the vehicle width direction outer side. The rocker inner panel 112 is joined to a floor panel 118. The vehicle frame structure 40 is provided to a vehicle width direction outer side face of the rocker inner panel 112. A hole 119 used in an operation to join the rocker inner panel 112 and the floor panel 118 together is formed in part of the vehicle frame structure 40.

As viewed along the vehicle front-rear direction, the rocker reinforcement 116 is formed with a hat-shaped cross-section profile opening toward the vehicle width direction inner side. The rocker reinforcement 116 is disposed between the rocker inner panel 112 and the rocker outer panel 114, and is joined to the rocker inner panel 112 and the rocker outer panel 114 so as to reinforce the rocker 110. The vehicle frame structure 40 is provided to an inner face of the rocker reinforcement 116.

The vehicle frame structure 40 may be provided to the rocker inner panel 112 and the rocker reinforcement 116 in this manner. The configuration of the fourth modified example is capable of suppressing an increase in cost and also capable of suppressing a reduction in the adhesiveness between the rocker inner panel 112 and the rocker reinforcement 116, and the respective fiber reinforced plastic members.

Fifth Modified Example

Figure 16B:
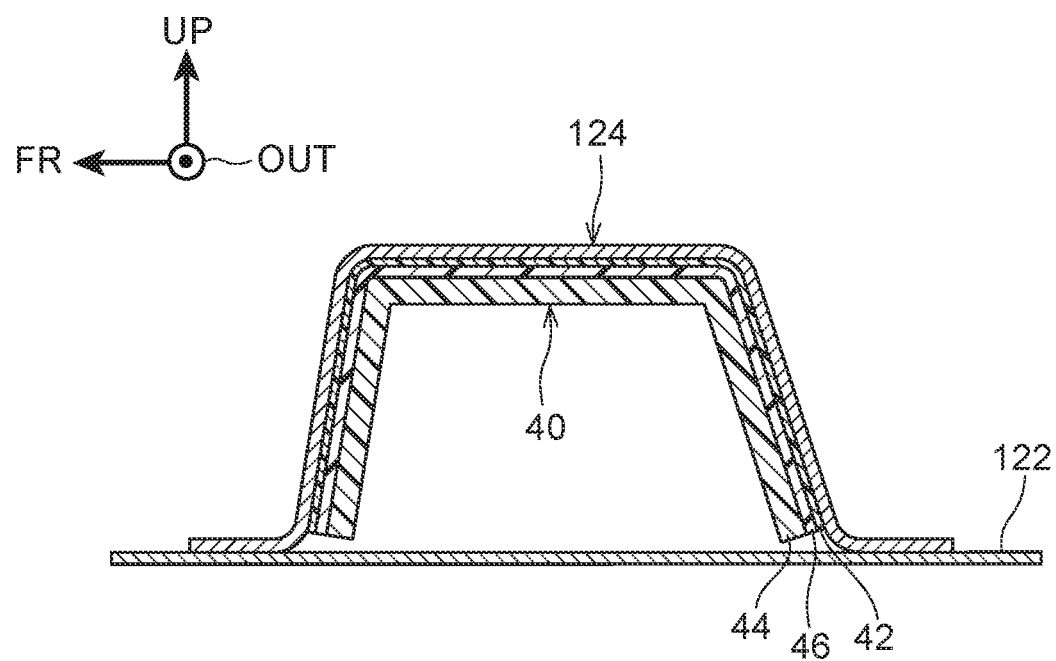
FIG. 16B is a vertical cross-section illustrating a floor panel and a floor cross member according to a fifth modified example.

FIG. 16B illustrates part of a floor panel 122. A floor cross member 124, serving as an example of a vehicle frame member, is superimposed on the floor panel 122 from the upper side and joined to the floor panel 122 by spot welding.

As viewed along the vehicle width direction, the floor cross member 124 is formed with a hat-shaped cross-section profile opening toward the vehicle lower side. The vehicle frame structure 40 is provided to an inner face of the floor cross member 124. The vehicle frame structure 40 may be provided to the floor cross member 124 in this manner. The configuration of the fifth modified example is capable of suppressing an increase in cost and also capable of suppressing a reduction in the adhesiveness between the floor cross member 124 and the respective fiber reinforced plastic members.

Other Modified Examples

In the vehicle frame structure 40, the plural carbon fibers 49 may be oriented in a different direction to the A direction (0° direction). As described in the second modified example to the fifth modified example, the vehicle frame member is not limited to a pillar, and may be a vehicle frame member provided at a location of the vehicle 10 other than a pillar.

In the vehicle frame structure 60, the base portion 64 may be configured by the thinned portion 78. Moreover, in the first modified example to the fifth modified example, the vehicle frame structure 60 may be provided instead of the vehicle frame structure 40. Moreover, configuration may be made in which only one type of rib out of the plural vertical ribs 67 or the plural horizontal ribs 68 are formed.

In the vehicle frame structure 70, the thickened portion 76 may be formed on its own, without forming the thinned portion 78. Moreover, in the first modified example to the fifth modified example, the vehicle frame structure 70 may be provided instead of the vehicle frame structure 40. Furthermore, in the vehicle frame structure 70, the plural vertical ribs 67 and the plural horizontal ribs 68 may be formed to at least one out of the peripheral portion 77 or the thickened portion 76. In addition, configuration may be made such that only one type of rib out of the plural vertical ribs 67 or the plural horizontal ribs 68 are formed.

The resin configuring the base material of the first fiber reinforced plastic member 44, 62, 72 is not limited to an unsaturated polyester resin, and may be another type of resin (such as a vinyl ester-based resin). The resin configuring the base material of the second fiber reinforced plastic member 46 is not limited to an unsaturated polyester resin, and may be another type of resin (such as an epoxy-based resin). Namely, the base material of the first fiber reinforced plastic member 44, 62, 72 and the base material of the second fiber reinforced plastic member 46 may be the same material, or may be different materials to each other.

Note that in cases in which the base materials are configured by different types of resin to each other, the combination of materials should be selected in consideration of their adhesive properties. Moreover, the method for forming the first fiber reinforced plastic member 44, 62, 72 is not limited to a method in which a sheet shaped member is superimposed on the second fiber reinforced plastic member 46 and applied with heat and pressure. The first fiber reinforced plastic member 44, 62, 72 may be formed by injection molding onto the second fiber reinforced plastic member 46. The fibers used to reinforce the base material are not limited to the carbon fibers 48, 49, and may be glass fibers. Namely, the fiber reinforced plastic employed in the vehicle frame structure is not limited to CFRP, and may be glass fiber reinforced plastic (GFRP).

Iron and aluminum are examples of materials that may be employed as the vehicle frame member. Epoxy-based, urethane-based, and acrylic-based materials are examples of materials that may be employed as the adhesive member.

The orientation direction of the continuous fibers is not limited to a direction at an angle of 0°, 45°, −45°, or 90° with respect to the A direction, and directions at other angles may be employed. There is no limitation to forming the continuous fibers in a single layer as described above, and plural stacked layers of continuous fibers may be formed.

When molding the vehicle frame structure 40, 60, 70, another lower mold may be employed instead of the outer panel 22. There is no limitation to providing the vehicle frame structure 40, 60, 70 to a center pillar, and the vehicle frame structure 40, 60, 70 may be provided to a front pillar or a rear pillar. There is no limitation to providing the vehicle frame structure 40, 60, 70 to an inner face of a vehicle frame member, and the vehicle frame structure 40, 60, 70 may be provided to an outer face of a vehicle frame member.

What is claimed is:

1. A vehicle frame structure comprising:
   an adhesive member that is superimposed on and adhered to a plate shaped vehicle frame member extending in one direction such that the adhesive member is superimposed in a thickness direction of the vehicle frame member;
   a first fiber reinforced plastic member that comprises a plurality of first fibers oriented in different directions to each other, and that is disposed spaced apart from the vehicle frame member in the thickness direction; and
   a second fiber reinforced plastic member that comprises a plurality of second fibers oriented in an orientation direction of an intersecting direction intersecting the thickness direction, that has a thinner thickness in the thickness direction than a thickness of the first fiber reinforced plastic member, and that is sandwiched between the adhesive member and the first fiber reinforced plastic member in the thickness direction.

2. The vehicle frame structure of claim 1, wherein the second fibers are oriented such that the intersecting direction is aligned with the one direction of the vehicle frame member.

3. The vehicle frame structure of claim 1, wherein the first fiber reinforced plastic member comprises a thickened portion having a thicker thickness in the thickness direction than a thickness of a peripheral portion.

4. The vehicle frame structure of claim 3, wherein the thickened portion is configured by a plurality of ribs projecting in the thickness direction from a base portion in close contact with the second fiber reinforced plastic member.

5. The vehicle frame structure of claim 3, wherein the first fiber reinforced plastic member comprises a thinned portion having a thinner thickness in the thickness direction than at least the thickness of the peripheral portion.

6. The vehicle frame structure of claim 1, wherein the vehicle frame member is a pillar that is configured to connect a rocker provided at a vehicle lower section to a roof side rail provided at a vehicle upper section and that extends in the intersecting direction.

* * * * *